United States Patent
Lee et al.

(10) Patent No.: US 12,262,370 B2
(45) Date of Patent: Mar. 25, 2025

(54) METHOD AND DEVICE FOR IDENTIFYING TRANSMISSION RESOURCE ON BASIS OF CONTROL INFORMATION IN NR V2X

(71) Applicant: LG ELECTRONICS INC., Seoul (KR)

(72) Inventors: Seungmin Lee, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 524 days.

(21) Appl. No.: 17/754,424

(22) PCT Filed: Oct. 5, 2020

(86) PCT No.: PCT/KR2020/013493
§ 371 (c)(1),
(2) Date: Mar. 31, 2022

(87) PCT Pub. No.: WO2021/066617
PCT Pub. Date: Apr. 8, 2021

(65) Prior Publication Data
US 2022/0400498 A1    Dec. 15, 2022

Related U.S. Application Data

(60) Provisional application No. 62/938,932, filed on Nov. 21, 2019, provisional application No. 62/911,196, filed on Oct. 4, 2019.

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04L 1/189* (2013.01); *H04W 72/23* (2023.01); *H04W 92/18* (2013.01)

(58) Field of Classification Search
None
See application file for complete search history.

(56) References Cited

U.S. PATENT DOCUMENTS

2016/0128082 A1    5/2016  Chen et al.
2018/0367255 A1   12/2018  Jeon et al.
(Continued)

FOREIGN PATENT DOCUMENTS

| CN | 106304351 | 1/2017 |
| CN | 110140315 | 8/2019 |
| WO | 2018171290 | 9/2018 |

OTHER PUBLICATIONS

PCT International Application No. PCT/KR2020/013493, International Search Report dated Jan. 15, 2021, 3 pages.
(Continued)

*Primary Examiner* — Alex Skripnikov
(74) *Attorney, Agent, or Firm* — LEE, HONG, DEGERMAN, KANG & WAIMEY

(57) ABSTRACT

Proposed is a method for performing wireless communication by a first device. The method may comprise the steps of: receiving a configured grant from a base station; transmitting a first physical sidelink control channel (PSCCH) or a first physical sidelink shared channel (PSSCH) to a second device through a first sidelink resource assigned by the configure grant; receiving a dynamic grant from the base station through a physical downlink control channel (PDCCH), wherein the dynamic grant comprises index information of the configured grant related to the dynamic grant; and on the basis of the index information of the configured grant, retransmitting the first PSCCH or the first PSSCH to the second device through a second sidelink resource assigned by the dynamic grant.

20 Claims, 26 Drawing Sheets

(51) Int. Cl.
*H04L 1/1867* (2023.01)
*H04W 72/23* (2023.01)
*H04W 92/18* (2009.01)

(56) References Cited

U.S. PATENT DOCUMENTS

| | | | | |
|---|---|---|---|---|
| 2018/0368174 | A1 | 12/2018 | Jeon et al. | |
| 2019/0261354 | A1 | 8/2019 | Fakoorian et al. | |
| 2019/0289638 | A1 | 9/2019 | Kung et al. | |
| 2020/0336253 | A1* | 10/2020 | He | H04W 76/11 |
| 2021/0028891 | A1* | 1/2021 | Zhou | H04W 4/40 |
| 2022/0046564 | A1* | 2/2022 | Shimoda | H04W 40/00 |
| 2022/0216946 | A1* | 7/2022 | Liu | H04L 1/1867 |
| 2022/0217768 | A1* | 7/2022 | Liu | H04L 1/1874 |
| 2022/0255680 | A1* | 8/2022 | Moon | H04W 72/23 |
| 2022/0303952 | A1* | 9/2022 | Hoang | H04W 72/0446 |

OTHER PUBLICATIONS

Ericsson, "Support of HARQ procedure over sidelink," 3GPP TSG-RAN WG2 #107bis, R1-1913327, Oct. 2019, 10 pages.
NTT Docomo Inc., "Offline discussions for enhanced configured grant PUSCH transmissions," 3GPP TSG RAN WG1 Meeting #96, R1-1903707, Feb.-Mar. 2019, 82 pages.
Vivo, "Remaining issues on sidelink configured grant," 3GPP TSG-RAN WG2 Meeting #107bis, R2-1912258, Oct. 2019, 9 pages.
Huawei et al., "Discussion on Sidelink Configured Grant support" 3GPP TSG-RAN WG2#107, R2-1911072, Aug. 2019, 6 pages.
Korean Intellectual Property Office Application No. 10-2022-7008831, Office Action dated Sep. 14, 2024, 6 pages.
Ericsson, "Feature lead summary #2 on Resource allocation for NR sidelink Mode 1," 3GPP TSG-RAN WG1 #97, R1-1907774, May 2019, 26 pages.
Spreadtrum Communications, "Consideration on NR sidelink mode 1 resource allocation," 3GPP TSG RAN WG1 #98, R1-1908948, Aug. 2019, 6 pages.
Samsung, "On Resource Allocation for NR V2X Mode 1," 3GPP TSG RAN WG1 #98, R1-1908476, Aug. 2019, 8 pages.
The State Intellectual Property Office of the People's Republic of China Application Serial No. 202080082299.3, Office Action dated Sep. 26, 2024, 10 pages.
Spreadtrum Communications, "Consideration on NR sidelink mode 1 resource allocation," 3GPP TSG RAN WG1 #98bis, R1-1910006, Oct. 2019, 4 pages.
Lenovo et al., "SL HARQ protocol operation," 3GPP TSG RAN WG2 Meeting #107bis, R1-1912686, Oct. 2019, 6 pages.

* cited by examiner

FIG. 4
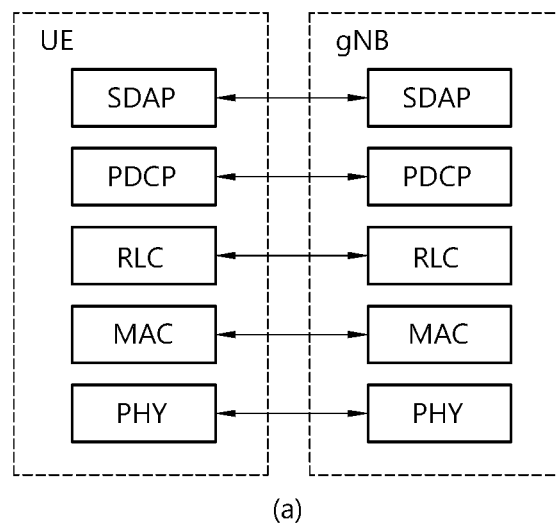
(a)
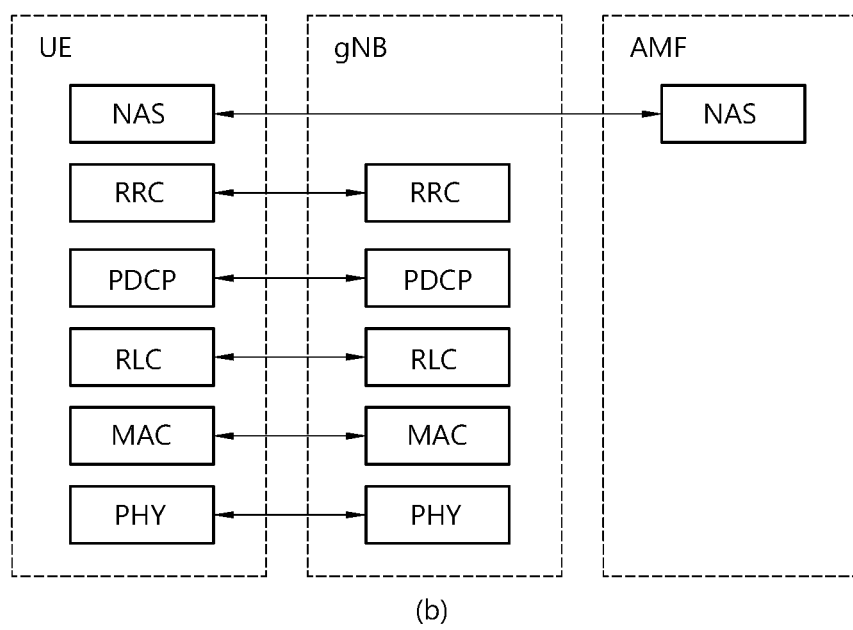
(b)

FIG. 8
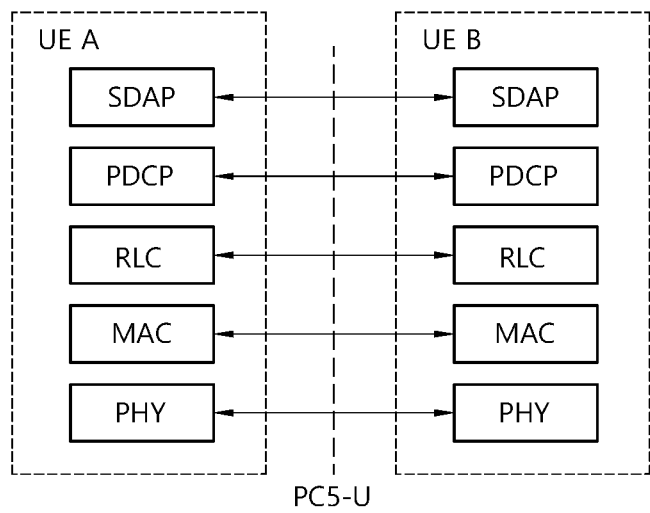
(a)
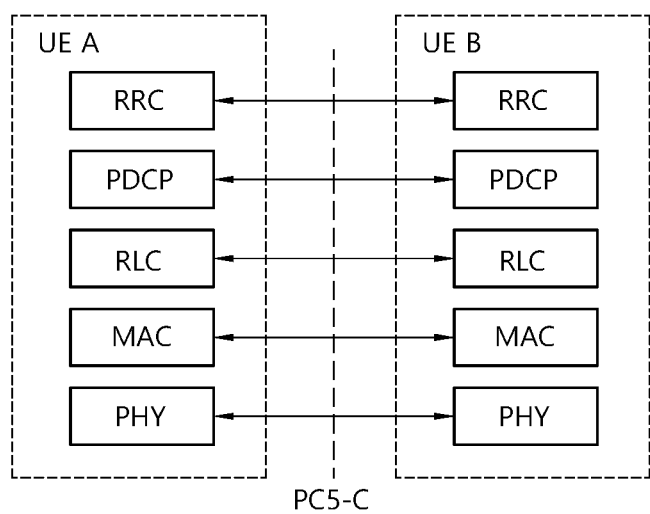
(b)

METHOD AND DEVICE FOR IDENTIFYING TRANSMISSION RESOURCE ON BASIS OF CONTROL INFORMATION IN NR V2X

CROSS-REFERENCE TO RELATED APPLICATIONS

This application is the National Stage filing under 35 U.S.C. 371 of International Application No. PCT/KR2020/013493, filed on Oct. 5, 2020, which claims the benefit of U.S. Provisional Application No. 62/911,196, filed on Oct. 4, 2019 and 62/938,932, filed on Nov. 21, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a transmitting UE may be allocated additional retransmission resource(s) from a base station through a mode 1 dynamic grant (DG) downlink control information (DCI). In this case, if the transmitting UE receives the mode 1 DG DCI from the base station, the transmitting UE needs to clearly identify which periodic resource(s) of a mode 1 configured grant (CG) the additional retransmission resource(s) allocated by the received mode 1 DG DCI is related to.

Technical Solutions

In one embodiment, a method for performing, by a first device, wireless communication is provided. The method may comprise: receiving, from a base station, a configured grant; transmitting, to a second device, a first physical sidelink control channel (PSCCH) or a first physical sidelink shared channel (PSSCH) through a first sidelink resource allocated by the configured grant; receiving, from the base station, a dynamic grant through a physical downlink control channel (PDCCH), wherein the dynamic grant includes index information of the configured grant related to the dynamic grant; and retransmitting, to the second device, the first PSCCH or the first PSSCH through a second sidelink resource allocated by the dynamic grant based on the index information of the configured grant.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
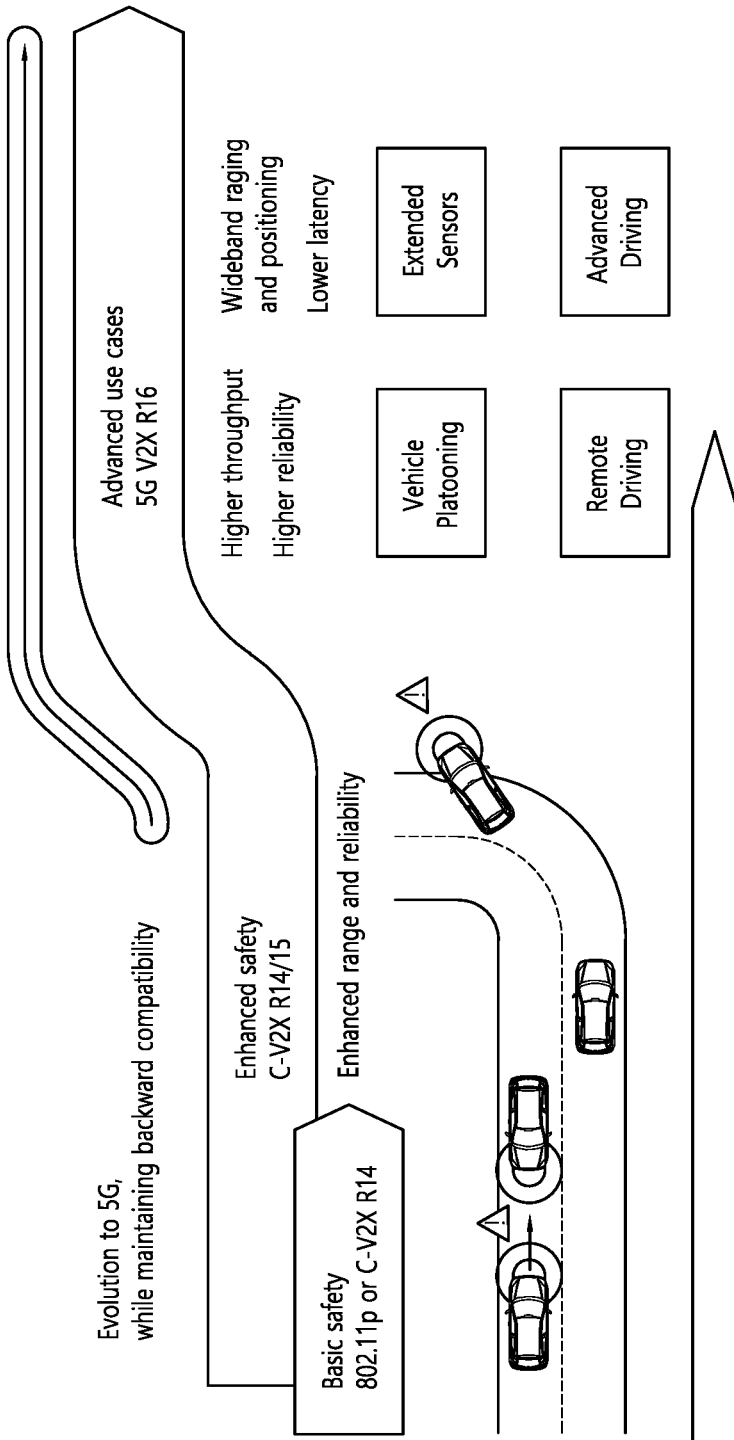
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
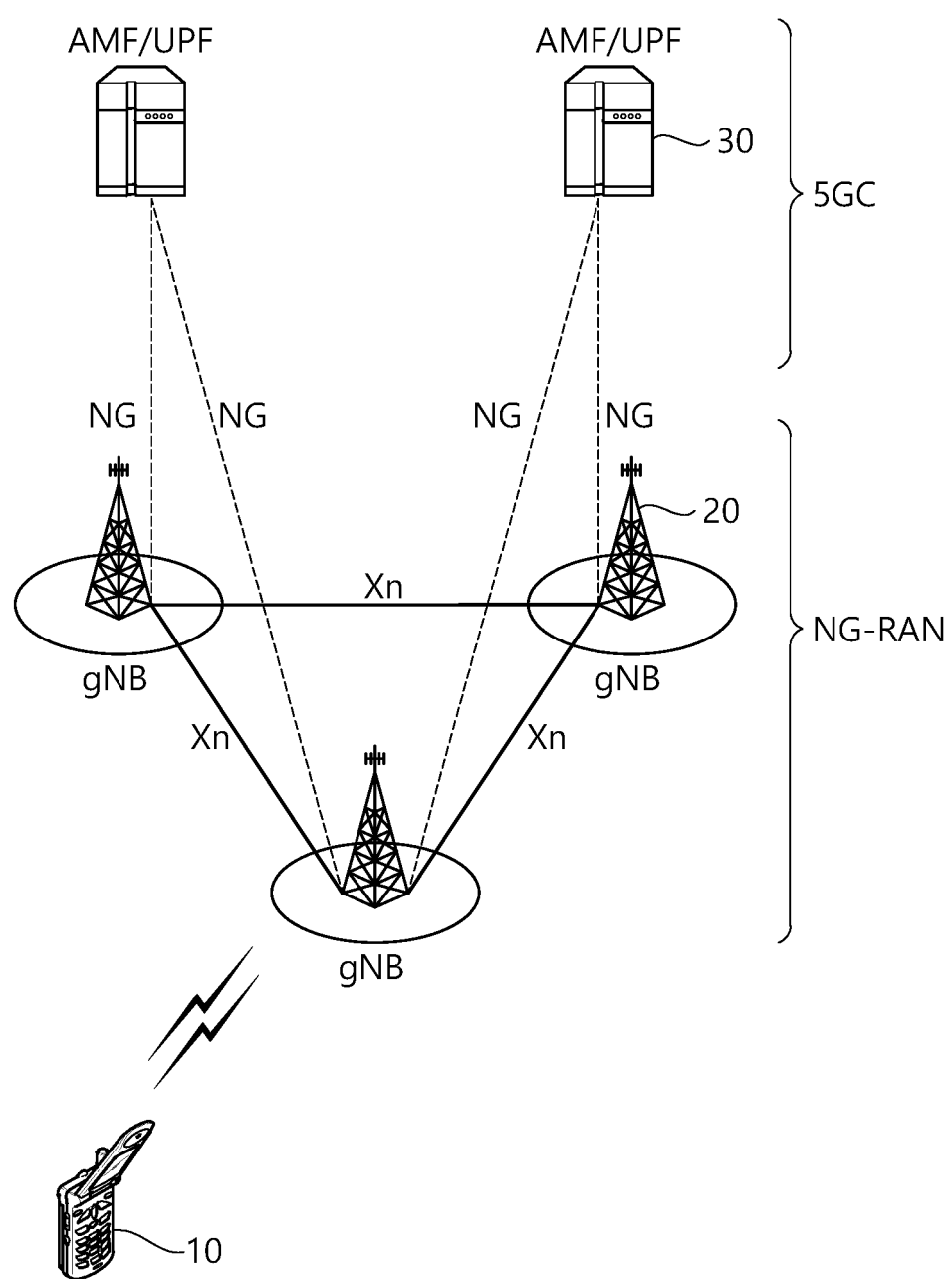
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
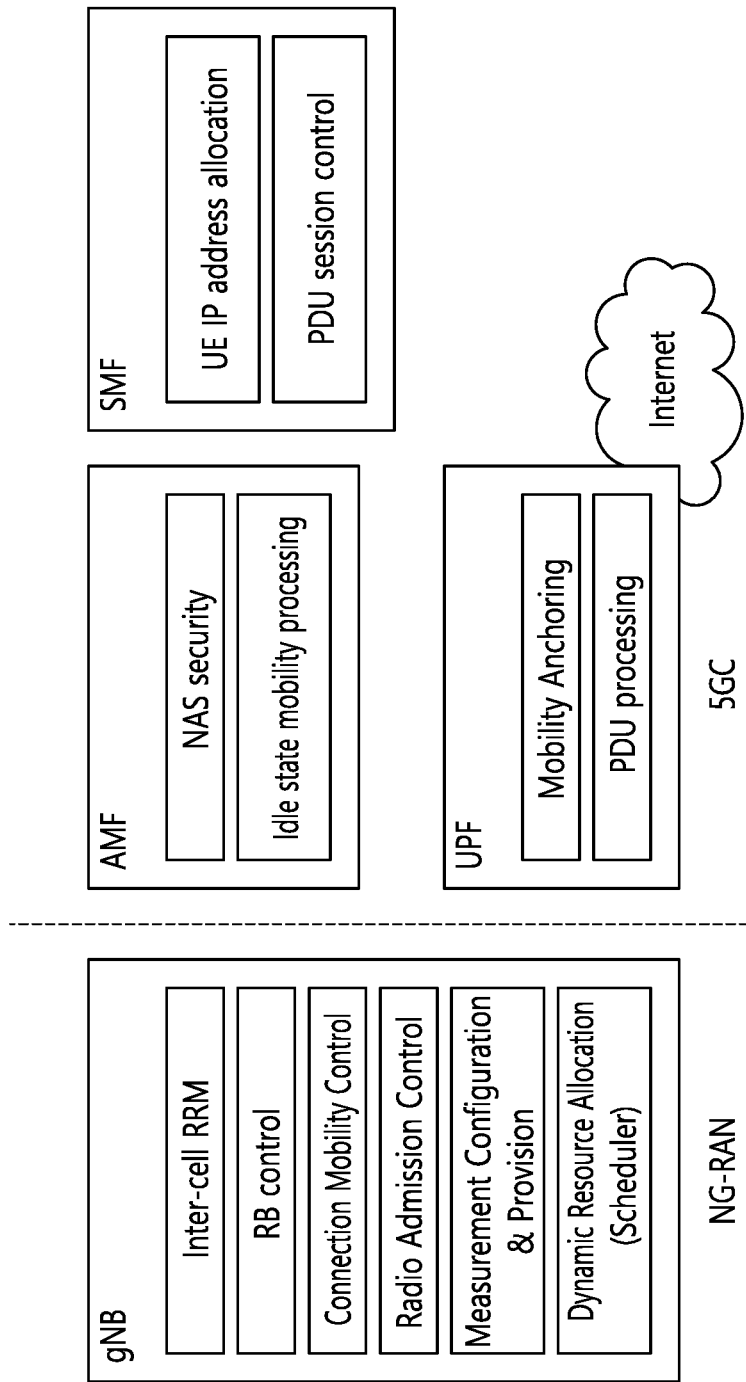
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
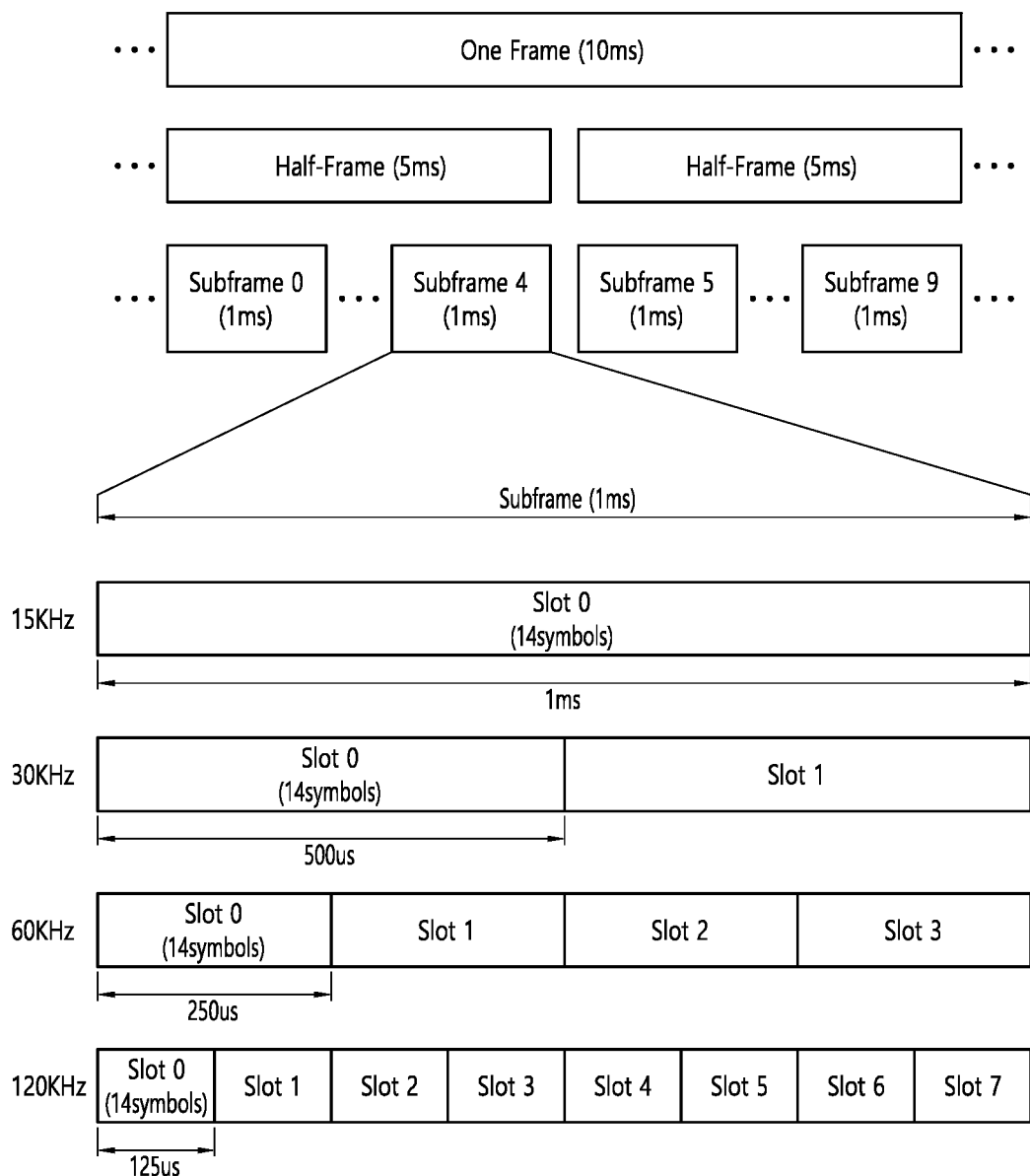
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
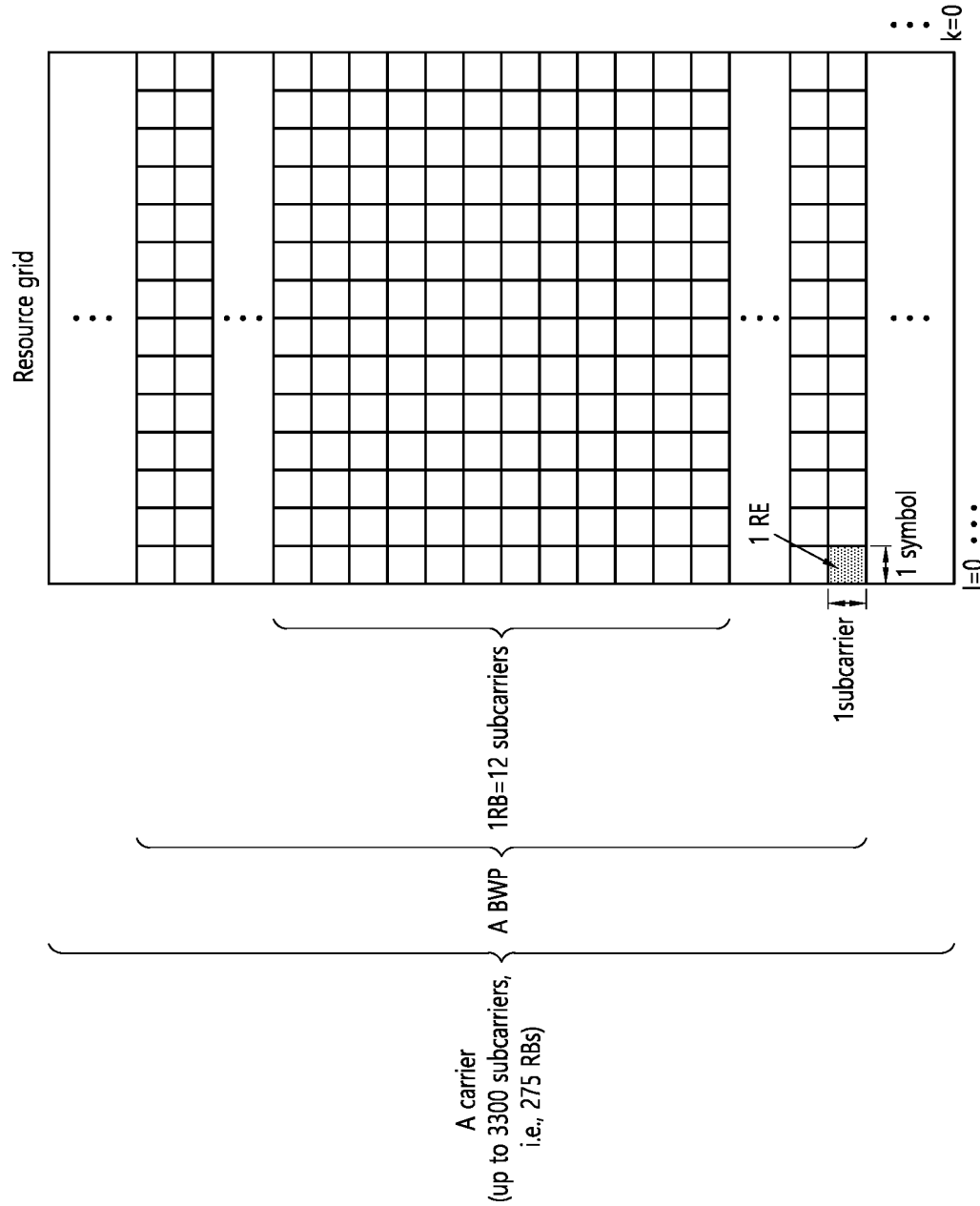
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
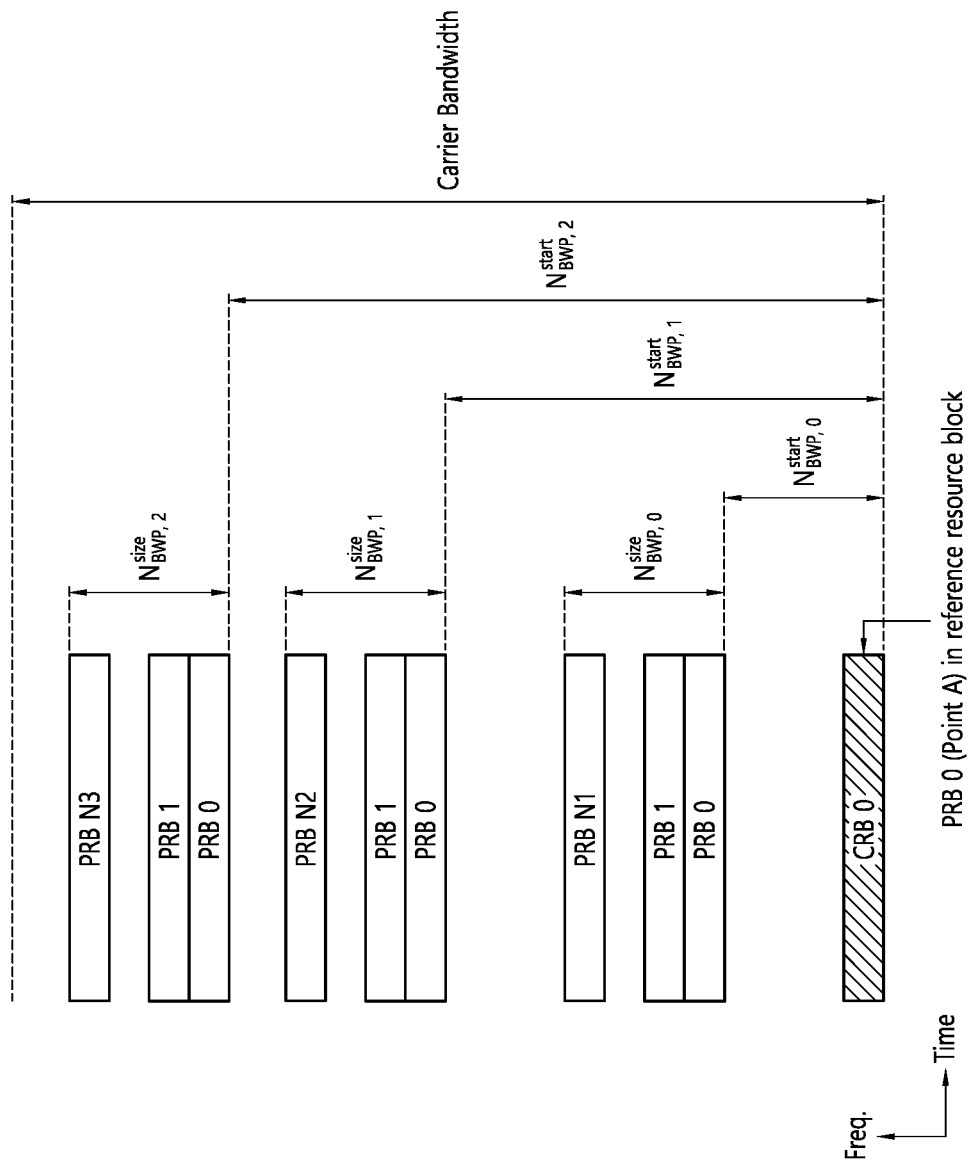
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
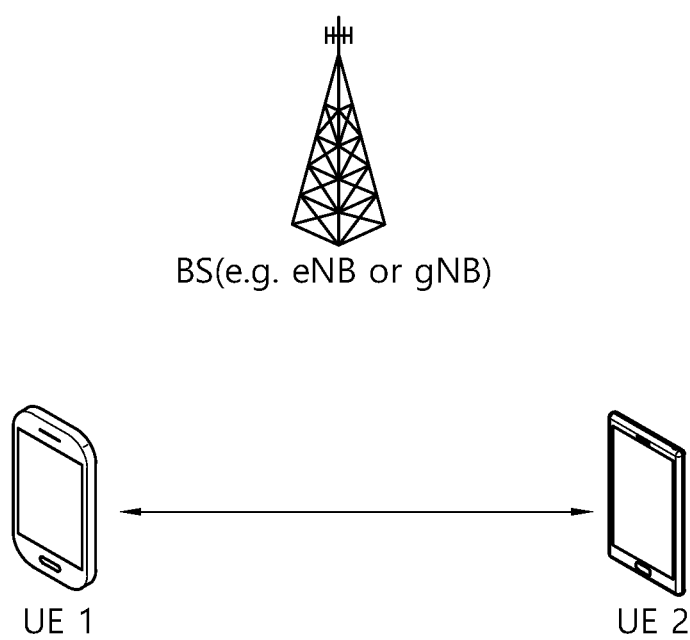
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
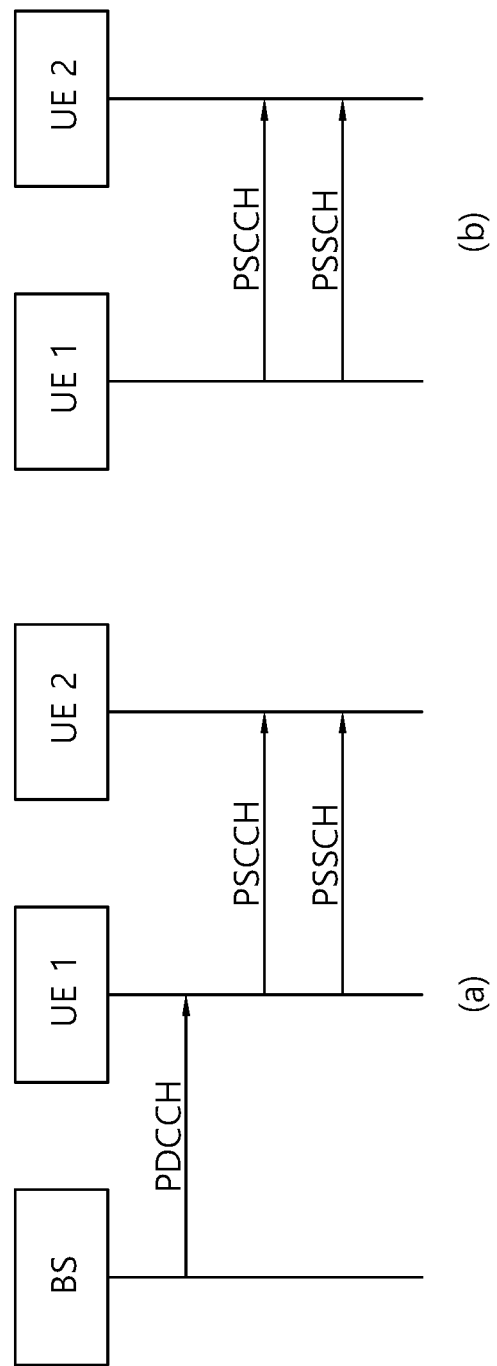
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
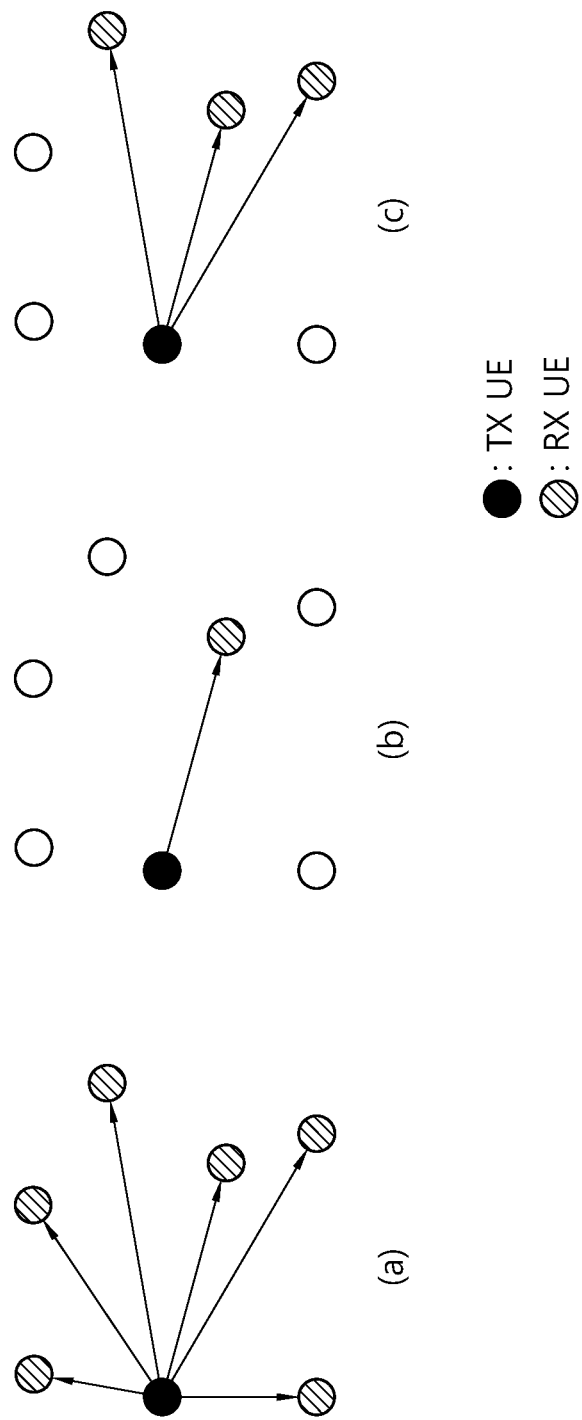
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
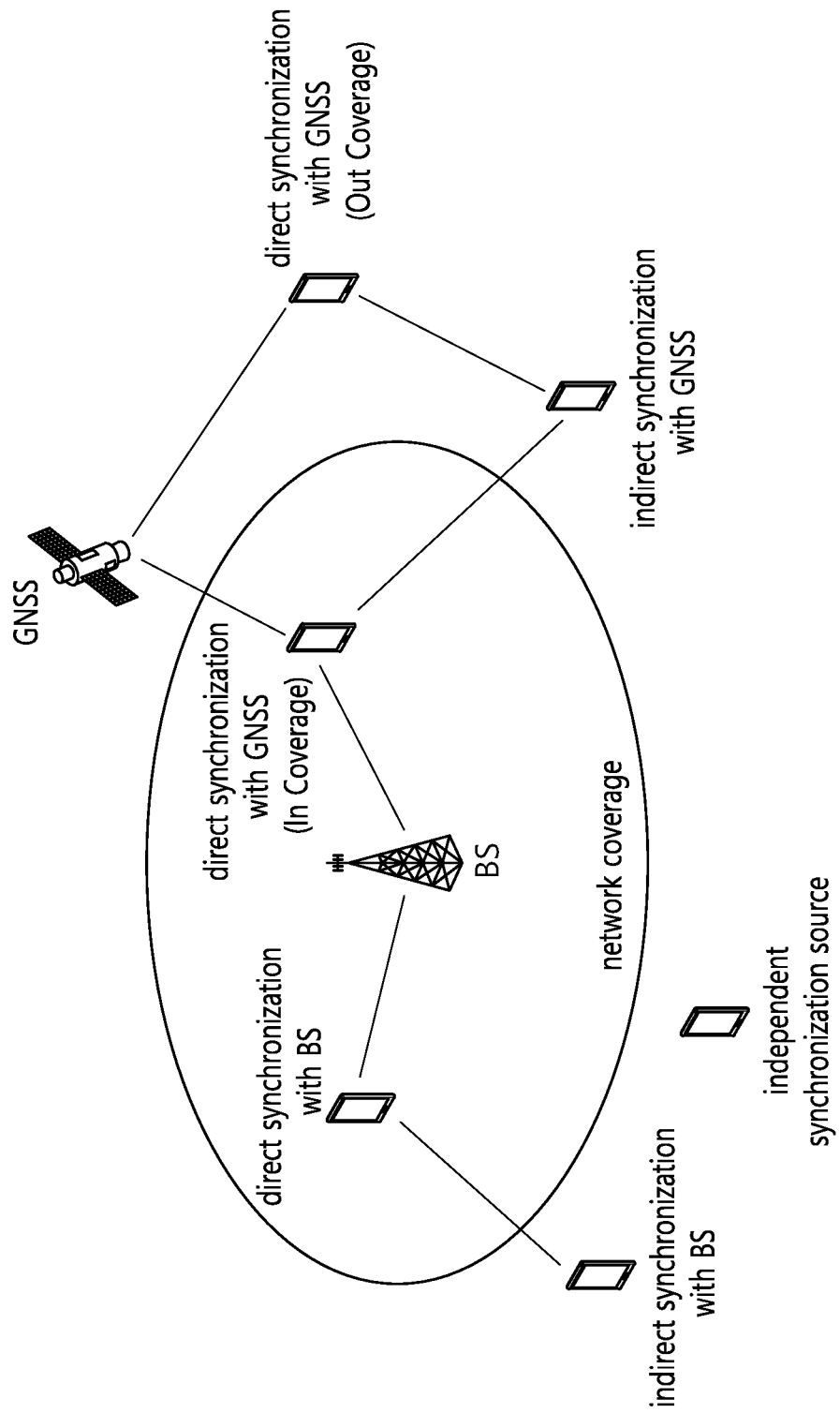
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

A SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast HARQ feedback option 1: NACK information may be transmitted to the TX UE only if the RX UE fails to decode/receive the PSSCH received from the TX UE.

(2) groupcast HARQ feedback option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel.

Meanwhile, in the present disclosure, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, etc. For example, the DL channel may include a PDCCH, a PDSCH, etc. For example, a SL channel may include a PSCCH, a PSSCH, a PSFCH, a PSBCH, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR resource allocation mode 1 (hereinafter, mode 1), the UE may use a plurality of transmission resources scheduled by a mode 1 configured grant DCI (hereinafter, mode 1 CG DCI) or a mode 1 dynamic grant DCI (hereinafter, mode 1 DG DCI) regardless of an initial/retransmission purpose related to a transport block (hereinafter, TB). Herein, for example, if a latency requirement related to the TB is satisfied, the transmitting UE may perform initial transmission or retransmission by using resources in a period adjacent to the plurality of scheduled transmission resources. For example, the UE may use resource(s) allocated by the mode 1 CG DCI or the mode 1 DG DCI only for sidelink communication related to the pre-signaled/configured UE. For example, the UE may use resource(s) allocated by the mode 1 CG DCI or the mode 1 DG DCI only for at least one of sidelink communication related to QoS parameter(s), sidelink communication related to a cast type (e.g., unicast, groupcast, or broadcast), sidelink communication related to a service type, sidelink communication related to a L1 destination/source ID and/or a L2 destination/source ID, or sidelink communication related to a destination UE pre-signaled/configured through a field included in a DCI from a base station.

Meanwhile, if the transmitting UE reports sidelink HARQ feedback information to the base station and a pre-defined condition is satisfied, the transmitting UE may be allocated additional retransmission resource(s) through the mode 1 DG DCI. Herein, for example, the pre-defined condition may be that NACK/DTX information is reported by the transmitting UE to the base station. For example, if the transmitting UE reports sidelink HARQ feedback information (e.g., NACK/DTX information) received from the receiving UE to the base station through a pre-configured PUCCH resource, the transmitting UE may be allocated additional retransmission resource(s) from the base station through the mode 1 DG DCI.

Herein, for example, the base station may arbitrarily determine when to transmit the mode 1 DG DCI to the UE. For example, the base station may determine a time for transmitting the mode 1 DG DCI to the UE as an arbitrary time within a pre-configured time window or before expiration of a timer or within a latency requirement of a related service.

Figure 13:
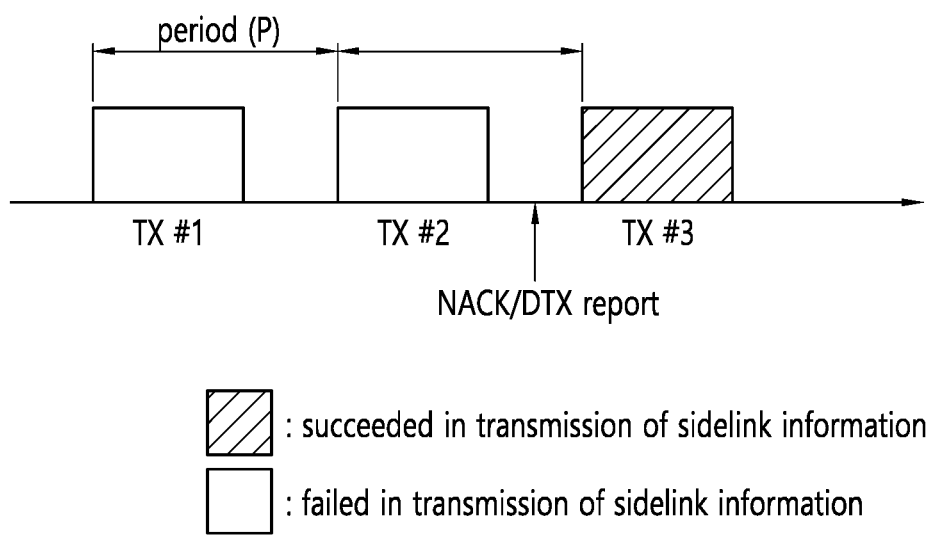
FIG. 13 shows an example of reporting HARQ feedback information to a base station if a transmitting UE fails in any one of periodic sidelink information transmission.

FIG. 13 shows an example of reporting HARQ feedback information to a base station if a transmitting UE fails in any one of periodic sidelink information transmission. The embodiment of FIG. 13 may be combined with various embodiments of the present disclosure.

Referring to FIG. 13, if the transmitting UE fails to transmit sidelink information (TX #1 and TX #2), the transmitting UE may report sidelink HARQ feedback information (e.g., NACK/DTX information) received from the receiving UE to the base station through a pre-configured PUCCH resource. In this case, the transmitting UE may be allocated additional retransmission resource(s) from the base station through the mode 1 DG DCI. In this case, if the transmitting UE receives the mode 1 DG DCI from the base station, the transmitting UE needs to clearly identify which periodic resource(s) of the mode 1 CG the additional retransmission resource(s) allocated by the received mode 1 DG DCI is related to. For example, the transmitting UE needs to clearly identify which periodic resource(s) of the mode 1 DG the additional retransmission resource(s) allocated by the received mode 1 DG DCI is related to.

Hereinafter, based on various embodiments of the present disclosure, a method for the transmitting UE to identify a location of a transmission resource based on control information and the device(s) supporting the same will be described. In the present disclosure, a sidelink HARQ process ID may refer to a HARQ process ID. Various embodiments of the present disclosure may be extended to mode 2 CG or mode 2 DG.

Figure 14:
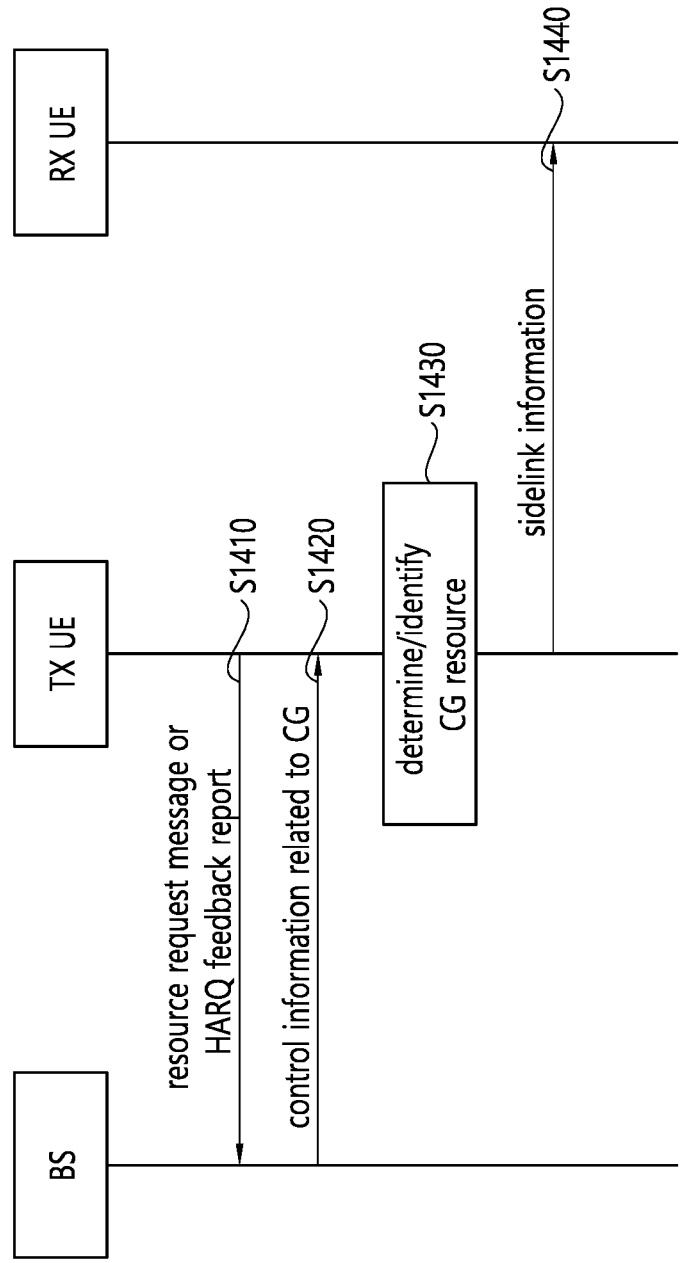
FIG. 14 shows a procedure for a transmitting UE to identify a location of a transmission resource based on control information, based on an embodiment of the present disclosure.

FIG. 14 shows a procedure for a transmitting UE to identify a location of a transmission resource based on control information, based on an embodiment of the present disclosure. The embodiment of FIG. 14 may be combined with various embodiments of the present disclosure.

Referring to FIG. 14, in step S1410, the transmitting UE may transmit a resource request message or a HARQ feedback report to the base station. For example, the transmitting UE may transmit a message (e.g., SR/BSR) requesting additional allocation of sidelink retransmission resource(s) to the base station through a PUCCH. For example, the transmitting UE may transmit a report related to sidelink HARQ feedback information to the base station through the PUCCH.

In step S1420, the base station may transmit control information related to a CG to the transmitting UE. In step S1430, the transmitting UE may identify or determine CG resource(s) based on the control information related to the CG received from the base station. In step S1440, the transmitting UE may transmit sidelink information to the receiving UE by using the identified or determined CG resource(s). For example, the sidelink information may include sidelink data and/or control information to be transmitted by the transmitting UE. Hereinafter, steps S1420 to S1440 will be described in more detail.

According to an embodiment, similar to an uplink configured grant operation of the NR system, the base station may derive or determine a sidelink HARQ process ID related to mode 1 CG resource(s) in a specific period based on a pre-configured equation. For example, the pre-configured equation may be the following Equation 1.

$$\text{HARQ Process ID} = [\text{floor}(\text{CURRENT\_symbol/periodicity})] \bmod \text{nrofHARQ-Processes} \quad [\text{Equation 1}]$$

Referring to Equation 1 above, for example, CURRENT_symbol may refer to SFN×numberOfSlotsPerFrame×numberOfSymbolsPerSlot+slot number in the frame×numberOfSymbolsPerSlot+symbol number in the slot. numberOfSlotsPerFrame may refer to the number of consecutive slots per a frame. numberOfSymbolsPerSlot may refer to the number of consecutive symbols per a slot. For example, Equation 1 may be an equation for deriving a HARQ process ID related to the first symbol of uplink transmission for an uplink configured grant.

For example, the transmitting UE may receive the mode 1 DG DCI for allocating additional retransmission resource(s) from the base station. For example, the base station may signal/transmit at least one of sidelink HARQ process ID information related to the mode 1 CG resource(s) associated with the retransmission resource(s), index information related to the CG associated with the CG and the retransmission resource(s), or new data indicator (NDI) information, to the transmitting UE through the mode 1 DG DCI for allocating additional retransmission resource(s). For example, the base station may signal/transmit at least one of sidelink HARQ process ID information related to the mode 1 CG resource(s) in a specific period associated with the retransmission resource(s), index information related to the CG associated with the CG in a specific period and the retransmission resource(s), or new data indicator (NDI) information, to the transmitting UE through the mode 1 DG DCI for allocating additional retransmission resource(s). The transmitting UE may identify or determine a mode 1 CG index targeted by the mode 1 DG DCI received from the base station and the mode 1 CG resource(s) in a specific period. Herein, for example, a sidelink process ID related to the mode 1 CG resource(s) may indicate/inform the linkage between the mode 1 DG DCI for allocating additional retransmission resource(s) and the mode 1 CG resource(s) in the specific target period. For example, the sidelink process ID related to the mode 1 CG resource(s) may be different from or independent of the sidelink HARQ process ID information indicated by a SCI.

Based on an embodiment of the present disclosure, the DCI related to the DG may be DCI format 3_0. For example, the DCI related to the DG may include a configuration index. For example, the configuration index may be 3 bits. For example, if the UE is configured to monitor DCI with cyclic redundancy check (CRC) scrambled by sidelink-configured scheduling-radio network temporary identity (SL-CS-RNTI), the configuration index may be 3 bits.

Based on an embodiment, the transmitting UE may designate or set a sidelink HARQ process ID value indicated by a SCI as a sidelink HARQ process ID information related to a mode 1 CG. For example, the transmitting UE may designate or set a sidelink HARQ process ID value indicated by a SCI as a sidelink HARQ process ID information related to a mode 1 CG used for transmission of sidelink information related to the sidelink HARQ process.

Based on an embodiment, the base station may not distinguish additional retransmission resource(s) allocated by the mode 1 DG DCI by a resource period. For example, the base station may allow the UE to use additional retransmission resource(s) allocated by the mode 1 DG DCI for all initial transmission and/or retransmission related to the target mode 1 CG. For example, the base station may signal/transmit only index information related to the CG associated with the retransmission resource(s) to the UE through the mode 1 DG DCI.

Alternatively, for example, the base station does not distinguish additional retransmission resource(s) allocated by the mode 1 DG DCI by the resource period and the index related to the CG, and the base station may allow the UE to use additional retransmission resource(s) allocated by the mode 1 DG DCI for all initial transmission and/or retransmission related to the target mode 1 CG.

Based on an embodiment, if the base station allocates only periodic resource(s) to the UE through the mode 1 CG DCI, and if the transmitting UE transmits sidelink information based on the allocated resource(s), the transmitting UE may determine or select a sidelink HARQ process ID value indicated by a SCI related to the sidelink information.

For example, if the transmitting UE requests retransmission resource(s) from the base station through a PUCCH, the transmitting UE may also signal/transmit sidelink HARQ process ID information related to the retransmission resource(s) to the base station. For example, if the transmitting UE reports sidelink HARQ feedback information received from the receiving UE through the PUCCH to the base station, the transmitting UE may also signal/transmit sidelink HARQ process ID information related to the HARQ feedback information. For example, the base station may designate or set a sidelink HARQ process ID value indicated by the mode 1 DG DCI for allocating additional retransmission resource(s) as sidelink HARQ process ID information reported by the UE.

For example, if the UE does not complete a first TB transmission based on a specific sidelink HARQ process ID, and if the UE needs to perform a second TB transmission through mode 1 CG resource(s) with the same sidelink HARQ process ID, the UE may omit/skip TB transmission related to a service having a relatively low priority or a relatively high latency requirement or a relatively low reliability requirement. For example, if the UE does not complete a first TB transmission based on a specific sidelink HARQ process ID, and if the UE needs to perform a second TB transmission through mode 1 CG resource(s) with the same sidelink HARQ process ID, the UE may omit/skip TB transmission related to a service having a relatively high priority or a relatively low latency requirement or a relatively high reliability requirement. For example, if the UE does not complete a first TB transmission based on a specific sidelink HARQ process ID, and if the UE needs to perform a second TB transmission through mode 1 CG resource(s) with the same sidelink HARQ process ID, the UE may omit/skip one of the first TB transmission and the second TB transmission, or may omit/skip the randomly selected TB.

For example, if the UE does not complete a first TB transmission based on a specific sidelink HARQ process ID, and if the UE needs to perform a second TB transmission through mode 1 CG resource(s) with the same sidelink HARQ process ID, the UE may transmit only the TB related to a service having a relatively low priority or a relatively high latency requirement or a relatively low reliability requirement. For example, if the UE does not complete a first TB transmission based on a specific sidelink HARQ process ID, and if the UE needs to perform a second TB transmission through mode 1 CG resource(s) with the same sidelink HARQ process ID, the UE may transmit only the TB related to a service having a relatively high priority or a relatively low latency requirement or a relatively high reliability requirement. For example, if the UE does not complete a first TB transmission based on a specific sidelink HARQ process ID, and if the UE needs to perform a second TB transmission through mode 1 CG resource(s) with the same sidelink HARQ process ID, the UE may perform either the first TB transmission or the second TB transmission, or may transmit only the randomly selected TB.

Based on an embodiment of the present disclosure, the transmitting UE may flush a buffer for a TB of a sidelink process associated with a HARQ process ID before the next CG resource associated with the HARQ process ID. For example, an operation in which the transmitting UE omits/skips the first TB may include an operation in which the transmitting UE flushes the buffer of the sidelink process related to the first TB. For example, before transmitting the second TB associated with a HARQ process ID, the transmitting UE may flush the HARQ buffer for the first TB associated with the HARQ process ID.

Based on an embodiment of the present disclosure, if the transmitting UE performs TB transmission or new TB transmission by using mode 1 CG resources in different periods or adjacent periods, it may be ambiguous as to which value the transmitting UE designates sidelink HARQ process ID information, CG index information, or NDI information indicated by a SCI. This is because mode 1 CG resources in different periods or adjacent periods may have different sidelink HARQ process IDs. For example, the sidelink HARQ process ID may be determined based on a pre-configured equation.

For example, in the case of mode 2 operation, the UE may determine or select sidelink HARQ process ID information indicated by a SCI related to mode 2 CG resource(s) in a specific period.

For example, the transmitting UE may designate or set a CG index value and/or a sidelink HARQ process ID value indicated by a SCI to CG index information and/or sidelink HARQ process ID information related to a mode 1 CG resource in which the first or initial transmission related to a TB is started. For example, the transmitting UE may designate or set a CG index value and/or a sidelink HARQ process ID value indicated by a SCI to CG index information and/or sidelink HARQ process ID information related to a mode 1 CG resource in which the last transmission or the last retransmission related to a TB will be performed.

For example, the base station may designate or set a sidelink HARQ process ID value indicated by the mode 1 DG DCI for allocating additional retransmission resource(s) to sidelink HARQ process ID information related to a PUCCH resource. For example, the base station may designate or set a sidelink HARQ process ID value indicated by the mode 1 DG DCI for allocating additional retransmission resource(s) to sidelink HARQ process ID information related to the mode 1 CG resource at the closest time or farthest time to the PUCCH resource among mode 1 CG resources associated with the PUCCH resource. For example, the base station may designate or set a sidelink HARQ process ID value indicated by the mode 1 DG DCI for allocating additional retransmission resource(s) to HARQ process ID information related to the mode 1 CG resource including the first or last PSSCH slot linked to the PSFCH slot linked with the PUCCH resource (e.g., semi-static sidelink HARQ codebook operation). Herein, for example, the PUCCH resource may include at least one of a PUCCH resource used for reporting related to sidelink HARQ feedback information and/or a PUCCH resource used for message transmission requesting additional allocation of sidelink retransmission resource(s).

For example, the transmitting UE may succeed in transmitting a first TB by using only some of mode 1 CG resources in a specific period, and may transmit a second TB in a buffer by using the remaining resources of the mode 1 CG resources. In this case, the transmitting UE may set a sidelink HARQ process ID value indicated by a SCI to a sidelink process ID information related to the mode CG resources in the specific period, and may toggle an NDI value. That is, the sidelink HARQ process ID value indicated by the SCI related to the first TB transmission may also be set to the same sidelink process ID information.

Figure 15:
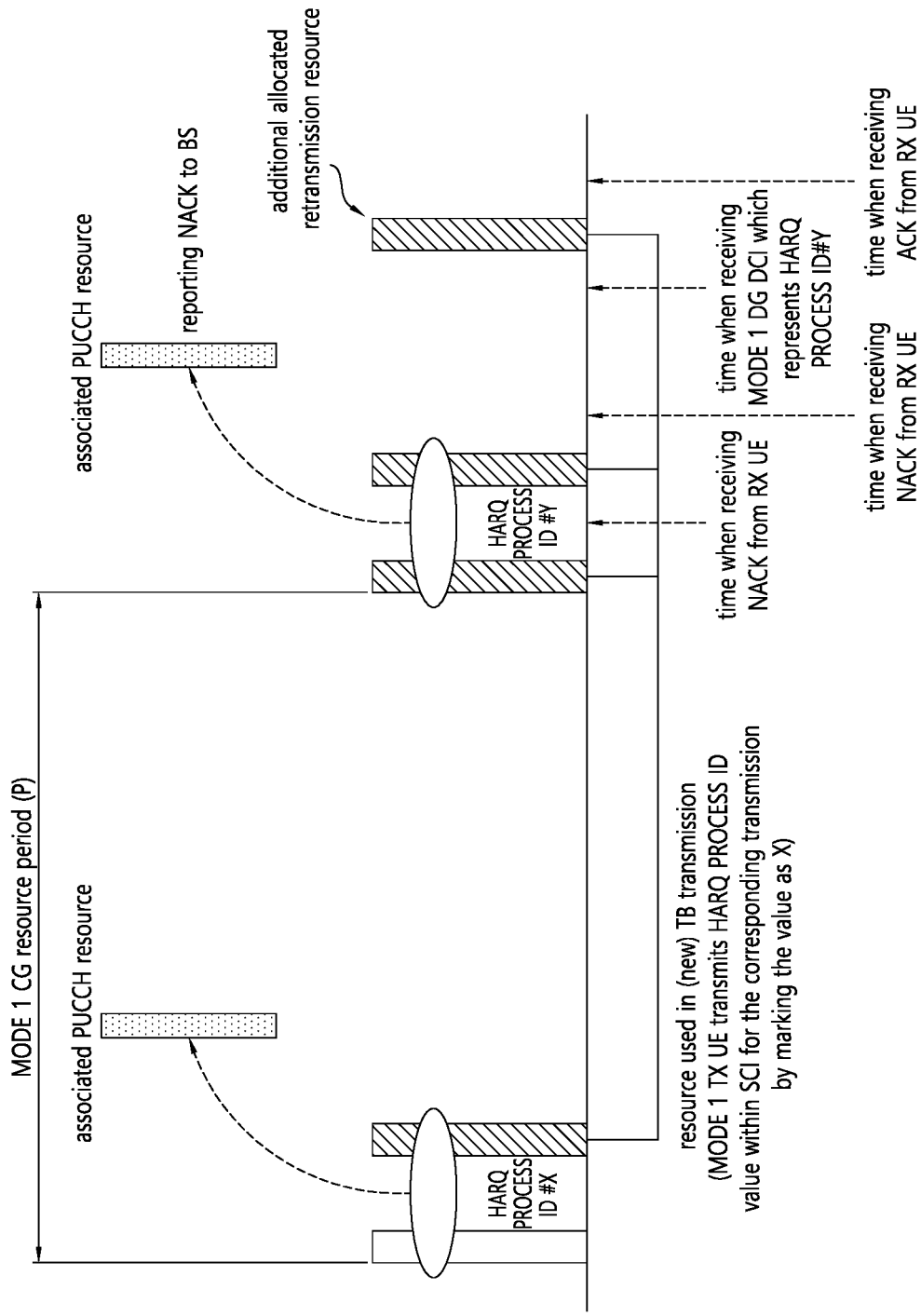
FIG. 15 shows an example in which a transmitting UE performs TB transmission or new TB transmission by using mode 1 CG resources in different periods or adjacent periods, based on an embodiment of the present disclosure.

FIG. 15 shows an example in which a transmitting UE performs TB transmission or new TB transmission by using mode 1 CG resources in different periods or adjacent periods, based on an embodiment of the present disclosure. The embodiment of FIG. 15 may be combined with various embodiments of the present disclosure.

Referring to FIG. 15, for example, the transmitting UE may perform new TB transmission by using mode 1 CG resources in adjacent periods with HARQ process ID #X/HARQ process ID #Y. For example, the mode 1 CG DCI may schedule resources with a period of P (i.e., two resources are allocated for each period). For example, the transmitting UE may set a sidelink HARQ process ID value indicated by the SCI to sidelink HARQ process ID #X related to the mode 1 CG resource in which the first or initial transmission related to a TB is performed. The base station may set a sidelink HARQ process ID value indicated by the mode 1 DG DCI for allocating additional retransmission resource(s) to sidelink HARQ process ID #Y related to the mode 1 CG resource associated with the PUCCH resource used for reporting sidelink HARQ feedback information.

Based on an embodiment, the transmitting UE may transmit sidelink scheduling request (SR)/buffer state request (BSR) to the base station, and the base station may schedule an initial transmission resource or retransmission resource(s) to the transmitting UE through the mode 1 DG DCI #X, the transmitting UE may report sidelink HARQ feedback based on the PUCCH resource configured/associated with the initial transmission resource or the retransmission resource(s) to the base station, and the base station may allocate additional retransmission resource(s) necessary for the transmitting UE through the mode 1 DG DCI #Y. In this case, for example, the base station may set a sidelink HARQ process ID value indicated by the mode 1 DG DCI #Y to sidelink HARQ process ID information indicated by the mode 1 DG DCI #X.

Alternatively, for example, the base station may set a sidelink HARQ process ID value indicated by the mode 1 DG DCI #Y to sidelink HARQ process ID information related to the PUCCH resource used for sidelink SR transmission and/or sidelink BSR transmission. In addition, the base station may set a sidelink HARQ process ID value indicated by the mode 1 DG DCI #X to sidelink HARQ process ID information related to the PUCCH resource used for sidelink SR transmission and/or sidelink BSR transmission.

Herein, for example, the transmitting UE may set a sidelink HARQ process ID value indicated by the SCI to sidelink HARQ process ID information related to the mode 1 DG resource used for transmission related to the sidelink HARQ process of the transmitting UE (e.g., a sidelink HARQ process ID value signaled by the DCI for allocating the mode 1 DG resource).

For example, if an operation related to the mode 1 CG is performed, the base station may allocate/schedule additional retransmission resource(s) to the transmitting UE through the mode 1 DG DCI. For example, the base station may allocate/schedule additional retransmission resource(s) to the transmitting UE through the mode 1 DG DCI based on SL HARQ feedback information received from the transmitting UE through a (pre-configured) PUCCH. In this case, for linkage between the mode 1 CG resource(s) and the retransmission resource(s) additionally allocated/scheduled through the mode 1 DG DCI, the base station may define/configure information/field for the linkage (e.g., ID and/or CG index and/or NDI) in the mode 1 CG DCI and the mode 1 DG DCI related to additional retransmission resource allocation/scheduling. For example, the ID may be a sidelink HARQ process ID. For example, the base station may transmit, to the transmitting UE through the mode 1 CG DCI, information related to the linkage between the mode 1 CG resource(s) and the retransmission resource(s) additionally allocated/scheduled through the mode 1 DG DCI. For example, the base station may transmit, to the transmitting UE through the mode 1 DG DCI, information related to the linkage between the mode 1 CG resource(s) and the retransmission resource(s) additionally allocated/scheduled through the mode 1 DG DCI.

Herein, for example, if the field is implemented in the form of ID or sidelink HARQ process ID, the base station may set the ID or the sidelink HARQ process ID value to a pre-configured specific value among a plurality of sidelink HARQ process IDs that can be used for an operation related to the mode 1 DG. Herein, for example, the base station may set/limit the maximum value for the number of sidelink HARQ process IDs related to the mode 1 DG that can be used as the field value. For example, the base station may set/limit the minimum value for the number of sidelink HARQ process IDs related to the mode 1 DG that can be used as the field value.

Herein, for example, if the base station configures/transmits the mode 1 type 1 CG and the mode 1 type 2 CG to the transmitting UE at the same time, the base station may independently or differently set an ID value or a sidelink HARQ process ID allocated to each CG. Herein, for example, if the field for the linkage is defined and the field is implemented in the form of ID or sidelink HARQ process ID, the base station may configure/allocate an ID or a sidelink HARQ process ID value differently for each mode 1 CG. For example, the base station may configure/allocate an ID or a sidelink HARQ process ID value for each of the plurality of mode 1 CGs differently, and the base station may configure/transmit the plurality of mode 1 CGs to the transmitting UE.

For example, if an operation related to the mode 1 CG is performed, the base station may allocate/schedule additional retransmission resource(s) through the mode 1 DG DCI. For example, the base station may allocate/schedule additional retransmission resource(s) to the transmitting UE through the mode 1 DG DCI, based on SL HARQ feedback information received from the transmitting UE through a (pre-configured) PUCCH. In this case, the maximum retransmission (allowed) number value pre-configured for the transmitting UE for the operation related to the mode 1 CG may include the number of (re)transmissions performed by the transmitting UE through retransmission resource(s) additionally allocated/scheduled through the mode 1 DG DCI. For example, the maximum retransmission (allowed) number value pre-configured for the transmitting UE for the operation related to the mode 1 CG may include the number of (re)transmissions performed by the transmitting UE through retransmission resource(s) additionally allocated/scheduled through the mode 1 DG DCI, as well as the number of (re)transmissions performed by the transmitting UE through the mode 1 CG resource(s). For example, the maximum retransmission (allowed) number value pre-configured for the transmitting UE for the operation related to the mode 1 CG may not include the number of (re)transmissions performed by the transmitting UE through retransmission resource(s) additionally allocated/scheduled through the mode 1 DG DCI.

For example, if the transmitting UE performs initial transmission related to a TB by using the mode 1 CG resource(s), and if the transmitting UE performs (re)transmission related to the TB by using retransmission resource(s) additionally allocated/scheduled through the mode 1 DG DCI (associated with the mode 1 CG resource(s)), the maximum retransmission (allowed) number value pre-configured for the transmitting UE for the operation related to the mode 1 CG may include the number of (re)transmissions performed by the transmitting UE through retransmission resource(s) additionally allocated/scheduled through the mode 1 DG DCI.

For example, if the transmitting UE performs initial transmission related to a TB by using the mode 1 DG resource(s), and if the transmitting UE performs (re)transmission related to the TB by using the mode 1 CG resource(s), the maximum retransmission (allowed) number value pre-configured for the transmitting UE for the operation related to the mode 1 CG may not include the number of transmissions performed by the transmitting UE through the mode 1 DG DCI.

Figure 16:
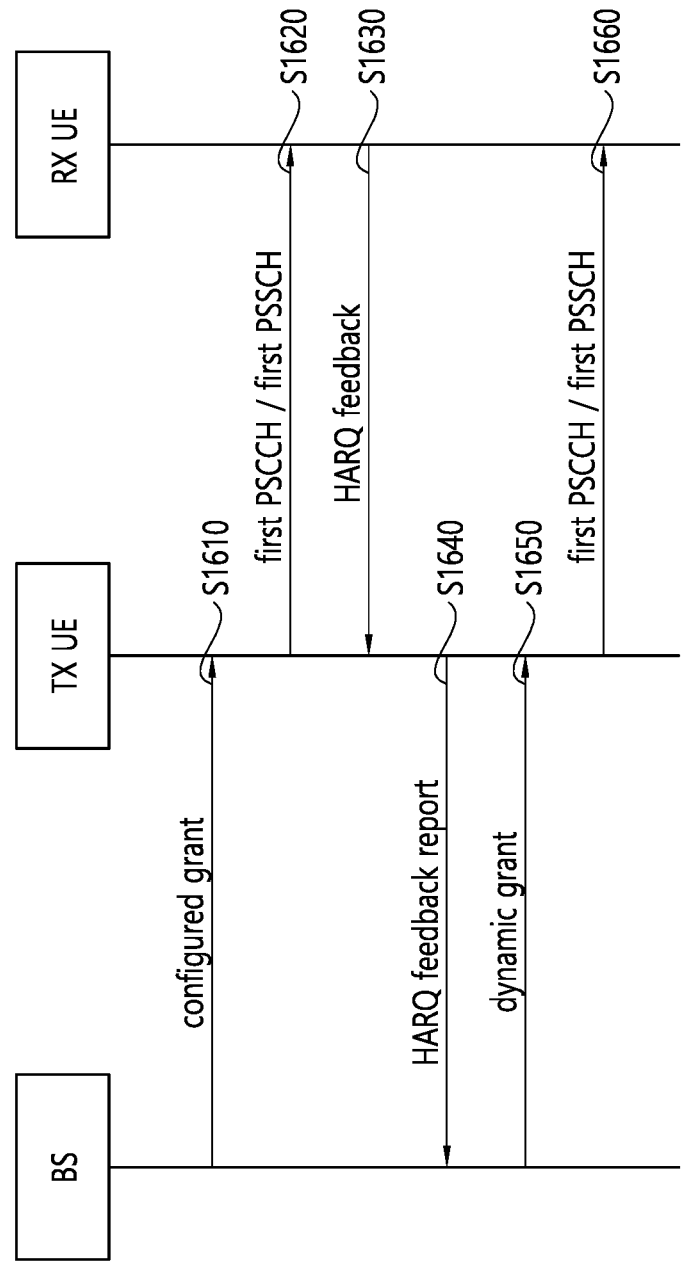
FIG. 16 shows an example in which a transmitting UE performs sidelink retransmission through resource(s) allocated by a DG based on index information of a CG, based on an embodiment of the present disclosure.

FIG. 16 shows an example in which a transmitting UE performs sidelink retransmission through resource(s) allocated by a DG based on index information of a CG, based on an embodiment of the present disclosure. The embodiment of FIG. 16 may be combined with various embodiments of the present disclosure.

Referring to FIG. 16, in step S1610, the base station may transmit a configured grant (hereinafter, CG) to the transmitting UE. For example, the transmitting UE may transmit a message requesting allocation of sidelink resource(s) to the base station through a PUCCH, and the base station may transmit the CG to the transmitting UE based on the message requesting allocation of sidelink resource(s). For example, the CG may be CG type 1 or CG type 2.

In step S1620, the transmitting UE may transmit a first PSCCH or a first PSSCH to the receiving UE based on the CG. For example, the transmitting UE may transmit the first PSCCH or the first PSSCH to the receiving UE through first sidelink resource(s) allocated by the CG. For example, the maximum number of retransmissions related to the first sidelink resource(s) allocated by the CG may be pre-configured. For example, the transmitting UE may transmit the first PSCCH or the first PSSCH to the receiving UE by the pre-configured maximum number of retransmissions through the first sidelink resource(s) allocated by the CG. For example, the transmitting UE may transmit a SCI to the receiving UE through the first PSCCH or the first PSSCH. For example, the SCI may include a second HARQ process ID.

In step S1630, the receiving UE may transmit HARQ feedback related to the first PSCCH or the first PSSCH to the transmitting UE. For example, the HARQ feedback may include ACK or NACK. For example, the receiving UE may transmit NACK corresponding to the first PSCCH or the first PSSCH to the transmitting UE through a PSFCH.

In step S1640, the transmitting UE may report the HARQ feedback related to the first PSCCH or the first PSSCH to the base station. For example, the transmitting UE may report the HARQ feedback related to the first PSCCH or the first PSSCH to the base station through a PUCCH. For example, the transmitting UE may request a DG from the base station in order to be allocated resource(s) for retransmitting the first PSCCH or the first PSSCH. For example, the transmitting UE may report the HARQ feedback related to the first PSCCH or the first PSSCH and the second HARQ process ID to the base station through the PUCCH. For example, the transmitting UE may report information related to NACK and the second HARQ process ID corresponding to the first PSCCH or the first PSSCH to the base station through the PUCCH.

In step S1650, the base station may transmit a dynamic grant (hereinafter, DG) to the transmitting UE. For example, the base station may transmit the DG to the transmitting UE through a PDCCH, based on the HARQ feedback reported by the transmitting UE. For example, the DG may include at least one of index information of the CG related to the DG or a first HARQ process ID related to the first sidelink resource(s). For example, the first HARQ process ID may be determined by a pre-configured equation. For example, the first HARQ process ID may be determined by Equation 1 described above. For example, a DCI related to the DG may include at least one of a field for a HARQ process ID, a field for an index of a CG, or an NDI field. For example, if a plurality of HARQ process IDs exist, the field value for the HARQ process ID may be a value for a pre-configured HARQ process ID among the plurality of HARQ process IDs. For example, the maximum value for the number of first HARQ process IDs may be configured.

In step S1660, the transmitting UE may retransmit the first PSCCH or the first PSSCH to the receiving UE based on the dynamic grant. For example, the transmitting UE may retransmit the first PSCCH or the first PSSCH to the receiving UE through second sidelink resource(s) allocated by the DG based on the index information of the CG related to the DG. For example, the maximum number of retransmissions related to the CG may include the number of times the transmitting UE retransmits the first PSCCH or the first PSSCH to the receiving UE through the second sidelink resource(s) allocated by the DG. For example, the maximum number of retransmissions related to the CG may not include the number of times the transmitting UE retransmits the second PSCCH or the second PSSCH to the receiving UE through the sidelink resource(s) allocated by the DG.

Additionally, for example, the first HARQ process ID and the second HARQ process ID may be independent or different from each other. Alternatively, for example, the first HARQ process ID may be determined as the second HARQ process ID. For example, if the CG is simultaneously configured as CG type 1 and CG type 2, a HARQ process ID related to the CG type 1 and a HARQ process ID related to the CG type 2 may be configured differently or independently.

Figure 17:
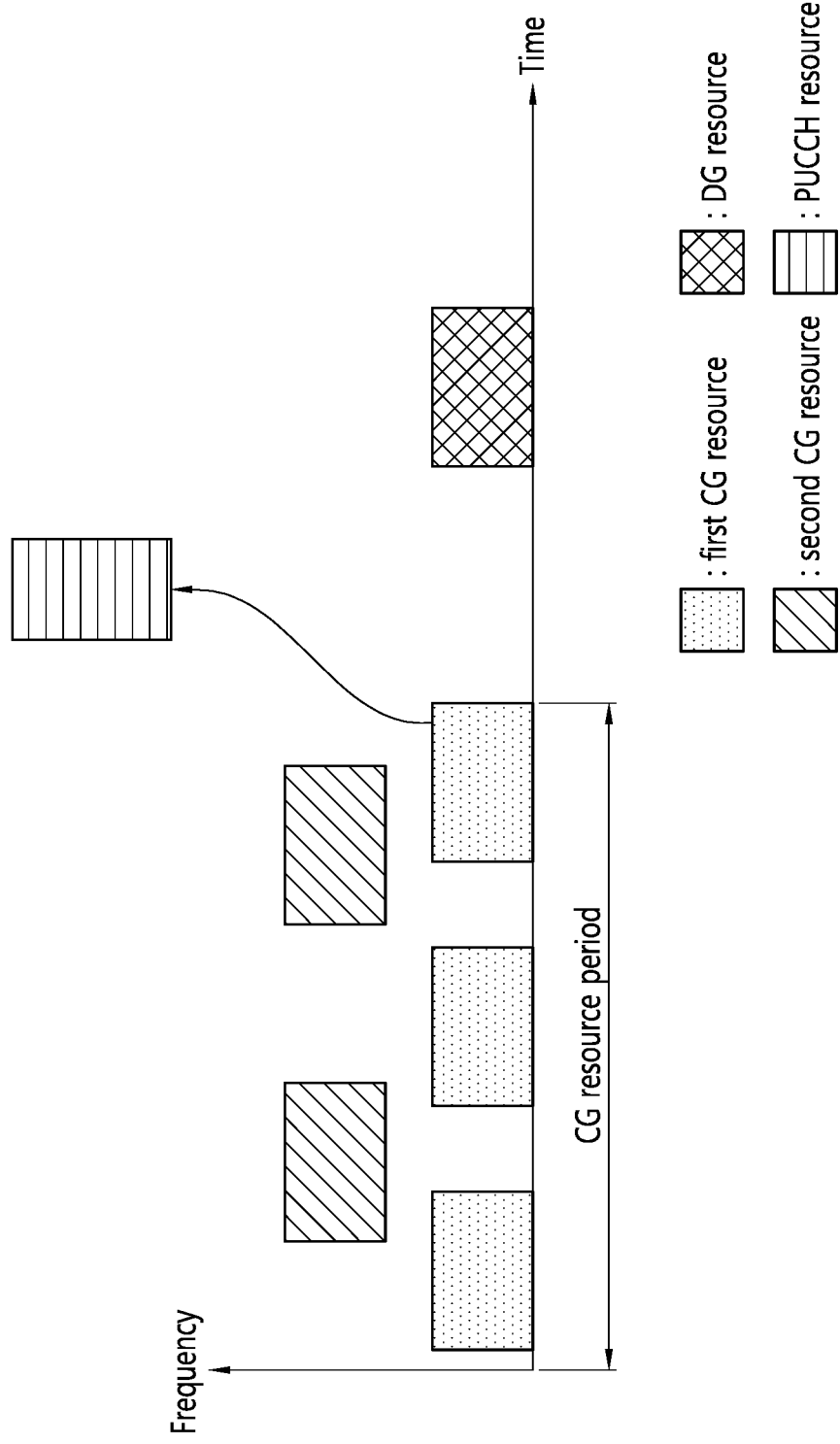
FIG. 17 shows an example in which a transmitting UE determines a CG resource related to a DG based on CG index information, based on an embodiment of the present disclosure.

FIG. 17 shows an example in which a transmitting UE determines a CG resource related to a DG based on CG index information, based on an embodiment of the present disclosure. The embodiment of FIG. 17 may be combined with various embodiments of the present disclosure.

Referring to FIG. 17, the base station may allocate a plurality of CG resources in different periods to the transmitting UE. For example, the base station may allocate first CG resource(s) and second CG resource(s) to the transmitting UE. The transmitting UE may transmit sidelink data to the receiving UE through the first CG resource(s) within a period related to the first CG resource(s). In this case, for example, if the transmitting UE fails to transmit sidelink data through the first CG resource(s) to the receiving UE, the transmitting UE may request additional resource(s) from the base station through a PUCCH resource associated with the first CG resource(s) in order to transmit additional sidelink data. For example, the transmitting UE may transmit information related to NACK to the base station through the PUCCH resource based on NACK for sidelink data received from the receiving UE. The base station may transmit a DG to the transmitting UE based on the additional resource request or the information related to NACK. Herein, the DG may include CG index information for distinguishing the first CG resource(s) from the second resource(s). The transmitting UE may determine DG resource(s) related to the first CG resource(s) based on the CG index information included in the DG. The transmitting UE may retransmit the sidelink data to the receiving UE through the DG resource(s) related to the first CG resource(s).

Figure 18:
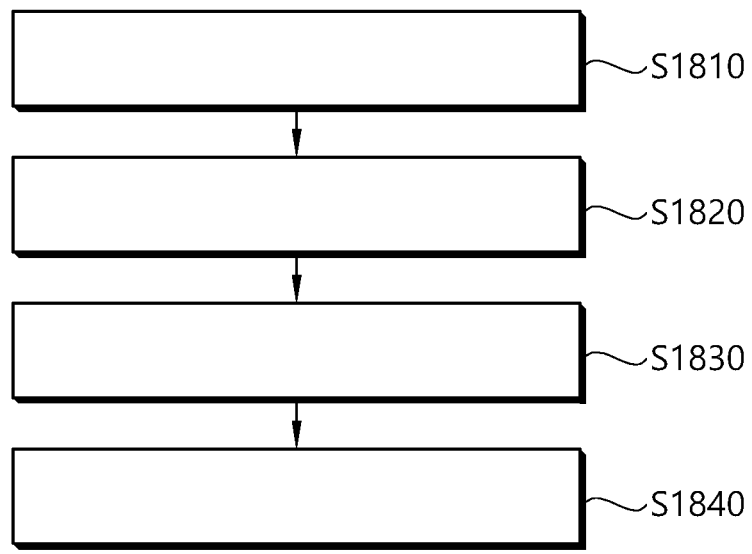
FIG. 18 shows a method for a first device to perform sidelink retransmission to a second device through a resource allocated by a DG based on index information of a CG, based on an embodiment of the present disclosure.

FIG. 18 shows a method for a first device to perform sidelink retransmission to a second device through a resource allocated by a DG based on index information of a CG, based on an embodiment of the present disclosure. The embodiment of FIG. 18 may be combined with various embodiments of the present disclosure.

Referring to FIG. 18, in step S1810, the first device 100 may receive, from a base station, a configured grant.

In step S1820, the first device 100 may transmit, to the second device 200, a first physical sidelink control channel (PSCCH) or a first physical sidelink shared channel (PSSCH) through a first sidelink resource allocated by the configured grant. For example, a maximum number of retransmissions related to the first sidelink resource allocated by the configured grant may be pre-configured. For example, the maximum number of retransmissions may include a number of retransmissions of the first PSCCH or the first PSSCH to the second device through the second sidelink resource allocated by the dynamic grant. For example, the maximum number of retransmissions may not include a number of transmissions of a second PSCCH or a second PSSCH through a sidelink resource allocated by the dynamic grant.

For example, the first device 100 may receive, from the second device 200, hybrid automatic repeat request (HARQ) feedback information related to the first PSCCH or the first PSSCH. For example, a sidelink control information (SCI) including a second HARQ process ID may be transmitted to the second device 200 through the first PSSCH or the first PSSCH.

For example, the first device 100 may report, to the base station, the HARQ feedback information through a physical uplink control channel (PUCCH). For example, the second HARQ process ID may be reported to the base station with the HARQ feedback information.

In step S1830, the first device 100 may receive, from the base station, a dynamic grant through a physical downlink control channel (PDCCH). For example, the dynamic grant may include index information of the configured grant related to the dynamic grant. For example, the dynamic grant may include a first HARQ process ID related to the first sidelink resource. For example, the first HARQ process ID may be determined based on a pre-configured equation. For example, the second HARQ process ID may be independent of the first HARQ process ID. For example, the first HARQ process ID may be determined as the second HARQ process ID. For example, a maximum value for a number of first HARQ process IDs may be configured.

For example, based on the configured grant being configured simultaneously as a configured grant type 1 and a configured grant type 2, a HARQ process ID allocated to the configured grant type 1 and a HARQ process ID allocated to the configured grant type 2 may be independently configured.

For example, a downlink control information (DCI) related to the dynamic grant may include at least one of a field for a HARQ process ID, a field for an index of the configured grant, or a new data indicator (NDI) field. For example, a value of the field for the HARQ process ID may be a value for a pre-configured HARQ process ID among a plurality of HARQ process IDs.

In step S1840, the first device 100 may retransmit, to the second device 200, the first PSCCH or the first PSSCH through a second sidelink resource allocated by the dynamic grant based on the index information of the configured grant.

The proposed method can be applied to the device(s) described in the present disclosure. First, the processor 102 of the first device 100 may control the transceiver 106 to receive, from a base station, a configured grant. In addition, the processor 102 of the first device 100 may control the transceiver 106 to transmit, to the second device 200, a first physical sidelink control channel (PSCCH) or a first physical sidelink shared channel (PSSCH) through a first sidelink resource allocated by the configured grant. In addition, the processor 102 of the first device 100 may control the transceiver 106 to receive, from the base station, a dynamic grant through a physical downlink control channel (PDCCH). In addition, the processor 102 of the first device 100 may control the transceiver 106 to retransmit, to the second device 200, the first PSCCH or the first PSSCH through a second sidelink resource allocated by the dynamic grant based on the index information of the configured grant.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, a configured grant; transmit, to a second device, a first physical sidelink control channel (PSCCH) or a first physical sidelink shared channel (PSSCH) through a first sidelink resource allocated by the configured grant; receive, from the base station, a dynamic grant through a physical downlink control channel (PDCCH), wherein the dynamic grant includes index information of the configured grant related to the dynamic grant; and retransmit, to the second device, the first PSCCH or the first PSSCH through a second sidelink resource allocated by the dynamic grant based on the index information of the configured grant.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a base station, a configured grant; transmit, to a second UE, a first physical sidelink control channel (PSCCH) or a first physical sidelink shared channel (PSSCH) through a first sidelink resource allocated by the configured grant; receive, from the base station, a dynamic grant through a physical downlink control channel (PDCCH), wherein the dynamic grant includes index information of the configured grant related to the dynamic grant; and retransmit, to the second UE, the first PSCCH or the first PSSCH through a second sidelink resource allocated by the dynamic grant based on the index information of the configured grant.

Based on an embodiment of the present disclosure, a non-transitory computer-readable storage medium storing instructions may be provided. For example, the instructions, when executed, may cause a first device to: receive, from a base station, a configured grant; transmit, to a second device, a first physical sidelink control channel (PSCCH) or a first physical sidelink shared channel (PSSCH) through a first sidelink resource allocated by the configured grant; receive, from the base station, a dynamic grant through a physical downlink control channel (PDCCH), wherein the dynamic grant includes index information of the configured grant related to the dynamic grant; and retransmit, to the second device, the first PSCCH or the first PSSCH through a second sidelink resource allocated by the dynamic grant based on the index information of the configured grant.

Figure 19:
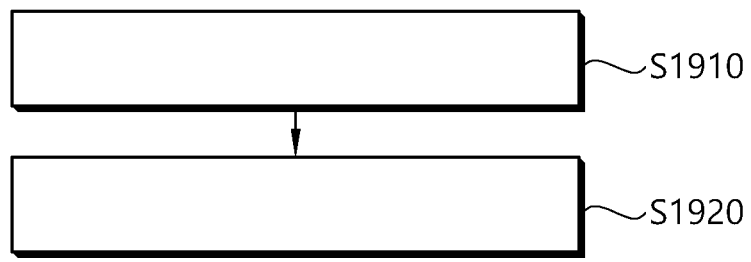
FIG. 19 shows a method for a second device to receive sidelink information from a first device through a resource allocated by a DG based on index information of a CG, based on an embodiment of the present disclosure.

FIG. 19 shows a method for a second device to receive sidelink information from a first device through a resource allocated by a DG based on index information of a CG, based on an embodiment of the present disclosure. The embodiment of FIG. 19 may be combined with various embodiments of the present disclosure.

Referring to FIG. 19, in step S1910, the second device 200 may receive, from the first device 100, a first physical sidelink control channel (PSCCH) or a first physical sidelink shared channel (PSSCH) through a first sidelink resource allocated by a configured grant. For example, the configured grant may be received from a base station to the first device 100. For example, a maximum number of retransmissions related to the first sidelink resource allocated by the configured grant may be pre-configured. For example, the maximum number of retransmissions may include a number of retransmissions of the first PSCCH or the first PSSCH to the second device through the second sidelink resource allocated by the dynamic grant. For example, the maximum number of retransmissions may not include a number of transmissions of a second PSCCH or a second PSSCH through a sidelink resource allocated by the dynamic grant. For example, a sidelink control information (SCI) including a second HARQ process ID may be transmitted to the second device 200 through the first PSSCH or the first PSSCH.

For example, the second device 200 may transmit hybrid automatic repeat request (HARQ) feedback information related to the first PSCCH or the first PSSCH to the first device 100. For example, the HARQ feedback information may be reported to the base station through a physical uplink control channel (PUCCH). For example, the second HARQ process ID may be reported to the base station with the HARQ feedback information.

In step S1920, the second device 200 may re-receive, from the first device 100, the first PSCCH or the first PSSCH through a second sidelink resource allocated by a dynamic grant, based on index information of the configured grant related to the dynamic grant. For example, the dynamic grant may be received from the base station to the first device through a physical downlink control channel (PDCCH). For example, the dynamic grant may include the index information of the configured grant related to the dynamic grant. For example, the dynamic grant may include a first HARQ process ID related to the first sidelink resource. For example, the first HARQ process ID may be determined based on a pre-configured equation. For example, the second HARQ process ID may be independent of the first HARQ process ID. For example, the first HARQ process ID may be determined as the second HARQ process ID. For example, a maximum value for a number of first HARQ process IDs may be configured.

For example, based on the configured grant being configured simultaneously as a configured grant type 1 and a configured grant type 2, a HARQ process ID allocated to the configured grant type 1 and a HARQ process ID allocated to the configured grant type 2 may be independently configured.

For example, a downlink control information (DCI) related to the dynamic grant may include at least one of a field for a HARQ process ID, a field for an index of the configured grant, or a new data indicator (NDI) field. For example, a value of the field for the HARQ process ID may be a value for a pre-configured HARQ process ID among a plurality of HARQ process IDs.

The proposed method can be applied to the device(s) described in the present disclosure. First, the processor 202 of the second device 200 may control the transceiver 206 to receive, from the first device 100, a first physical sidelink control channel (PSCCH) or a first physical sidelink shared channel (PSSCH) through a first sidelink resource allocated by a configured grant. In addition, the processor 202 of the second device 200 may control the transceiver 206 to re-receive, from the first device 100, the first PSCCH or the first PSSCH through a second sidelink resource allocated by a dynamic grant, based on index information of the configured grant related to the dynamic grant.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a first physical sidelink control channel (PSCCH) or a first physical sidelink shared channel (PSSCH) through a first sidelink resource allocated by a configured grant; re-receive, from the first device, the first PSCCH or the first PSSCH through a second sidelink resource allocated by a dynamic grant, based on index information of the configured grant related to the dynamic grant. For example, the configured grant may be received from a base station to the first device. For example, the dynamic grant may be received from the base station to the first device through a physical downlink control channel (PDCCH). For example, the dynamic grant may include the index information of the configured grant related to the dynamic grant.

Figure 20:
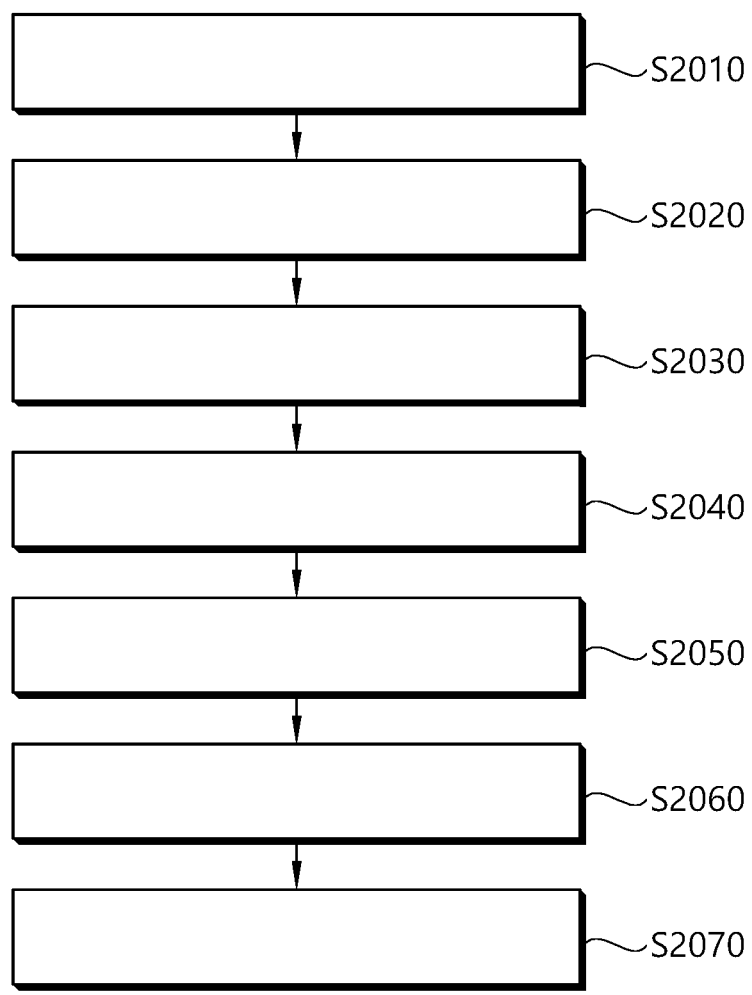
FIG. 20 shows a method for a first device to perform sidelink synchronization and to perform sidelink retransmission to a second device through a resource allocated by a DG based on index information of a CG, based on an embodiment of the present disclosure.

FIG. 20 shows a method for a first device to perform sidelink synchronization and to perform sidelink retransmission to a second device through a resource allocated by a DG based on index information of a CG, based on an embodiment of the present disclosure. The embodiment of FIG. 20 may be combined with various embodiments of the present disclosure.

Referring to FIG. 20, in step S2010, the first device 100 may select a synchronization source based on a sidelink synchronization priority. For example, the synchronization source may include at least one of a GNSS, a base station, or a UE. For example, the sidelink synchronization priority may be configured based on Table 5 or Table 6 described above. For example, the sidelink priority may be pre-configured for the first device 100.

In step S2020, the first device 100 may obtain synchronization based on the synchronization source. For example, the first device 100 may perform synchronization with the selected synchronization source.

In step S2030, the first device 100 may transmit a sidelink-synchronization signal block (S-SSB) block to the second device 200 based on the obtained synchronization. For example, the S-SSB block may include a sidelink primary synchronization signal (S-PSS), a sidelink secondary synchronization signal (S-SSS), and a physical sidelink broadcast channel (PSBCH).

In step S2040, the first device 100 may receive a CG from the base station.

In step S2050, the first device 100 may transmit a first PSCCH or a first PSSCH to the second device 200 through a first sidelink resource allocated by the CG. For example, the maximum number of retransmissions related to the first sidelink resource allocated by the CG may be pre-configured. For example, the maximum number of retransmissions may include the number of retransmissions of the first PSCCH or the first PSSCH to the second device 200 through a second sidelink resource allocated by a DG. For example, the maximum number of retransmissions may not include the number of transmissions of a second PSCCH or a second PSSCH through a sidelink resource allocated by the DG.

For example, the first device 100 may receive HARQ feedback information related to the first PSCCH or the first PSSCH from the second device 200. For example, a SCI including a second HARQ process ID may be transmitted to the second device 200 through the first PSSCH or the first PSSCH.

For example, the first device 100 may report HARQ feedback information to the base station through a PUCCH. For example, the second HARQ process ID may be reported to the base station with the HARQ feedback information.

In step S2060, the first device 100 may receive the DG from the base station through a physical downlink control channel (PDCCH). For example, the DG may include index information of the CG related to the DG. For example, the DG may include a first HARQ process ID related to the first sidelink resource. For example, the first HARQ process ID may be determined based on a pre-configured equation. For example, the first HARQ process ID and the second HARQ process ID may be independent of each other. For example, the first HARQ process ID may be determined as the second HARQ process ID. For example, the maximum value for the number of first HARQ process IDs may be configured.

For example, based on the configured grant being configured simultaneously as a configured grant type 1 and a configured grant type 2, a HARQ process ID allocated to the configured grant type 1 and a HARQ process ID allocated to the configured grant type 2 may be independently configured.

For example, a downlink control information (DCI) related to the dynamic grant may include at least one of a field for a HARQ process ID, a field for an index of the configured grant, or a new data indicator (NDI) field. For example, a value of the field for the HARQ process ID may be a value for a pre-configured HARQ process ID among a plurality of HARQ process IDs.

In step S2070, the first device 100 may retransmit the first PSCCH or the first PSSCH to the second device 200 through the second sidelink resource allocated by the DG based on the CG index information.

The proposed method can be applied to the device(s) described in the present disclosure. First, the processor 102 of the first device 100 may select a synchronization source based on a sidelink synchronization priority. In addition, the processor 102 of the first device 100 may obtain synchronization based on the synchronization source. In addition, the processor 102 of the first device 100 may control the transceiver 106 to transmit the S-SSB block to the second device 200 based on the obtained synchronization. For example, the processor 102 of the first apparatus 100 may control the transceiver 106 to receive the CG from the base station. In addition, the processor 102 of the first device 100 may control the transceiver 106 to transmit the first PSCCH or the first PSSCH to the second device 200 through the first sidelink resource allocated by the CG. In addition, the processor 102 of the first device 100 may control the transceiver 106 to receive the DG from the base station through a physical downlink control channel (PDCCH). In addition, the processor 102 of the first device 100 may control the transceiver 106 to retransmits the first PSCCH or the first PSSCH to the second device 200 through the second sidelink resource allocated by the DG based on the index information of the CG.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: select a synchronization source based on a sidelink synchronization priority; obtain synchronization based on the synchronization source; transmit S-SSB block, to a second device, based on the obtained synchronization; receive a configured grant from a base station; transmitting a first physical sidelink control channel (PSCCH) or a first physical sidelink shared channel (PSSCH) to the second device through a first sidelink resource allocated by the configured grant; receiving a dynamic grant from the base station through a physical downlink control channel (PDCCH), wherein the dynamic grant includes index information of the configured grant related to the dynamic grant; retransmitting the first PSCCH or the first PSSCH to the second device through a second sidelink resource allocated by the dynamic grant based on the index information of the configured grant.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: select a synchronization source based on a sidelink synchronization priority; obtain synchronization based on the synchronization source; transmit S-SSB block, to a second UE, based on the obtained synchronization; receive a configured grant from a base station; transmitting a first physical sidelink control channel (PSCCH) or a first physical sidelink shared channel (PSSCH) to the second UE through a first sidelink resource allocated by the configured grant; receiving a dynamic grant from the base station through a physical downlink control channel (PDCCH), wherein the dynamic grant includes index information of the configured grant related to the dynamic grant; retransmitting the first PSCCH or the first PSSCH to the second UE through a second sidelink resource allocated by the dynamic grant based on the index information of the configured grant.

Based on an embodiment of the present disclosure, a non-transitory computer-readable storage medium storing instructions may be provided. For example, the instructions, when executed, may cause a first device to: select a synchronization source based on a sidelink synchronization priority; obtain synchronization based on the synchronization source; transmit S-SSB block, to a second device, based on the obtained synchronization; receive a configured grant from a base station; transmitting a first physical sidelink control channel (PSCCH) or a first physical sidelink shared channel (PSSCH) to the second device through a first sidelink resource allocated by the configured grant; receiving a dynamic grant from the base station through a physical downlink control channel (PDCCH), wherein the dynamic grant includes index information of the configured grant related to the dynamic grant; retransmitting the first PSCCH or the first PSSCH to the second device through a second sidelink resource allocated by the dynamic grant based on the index information of the configured grant.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
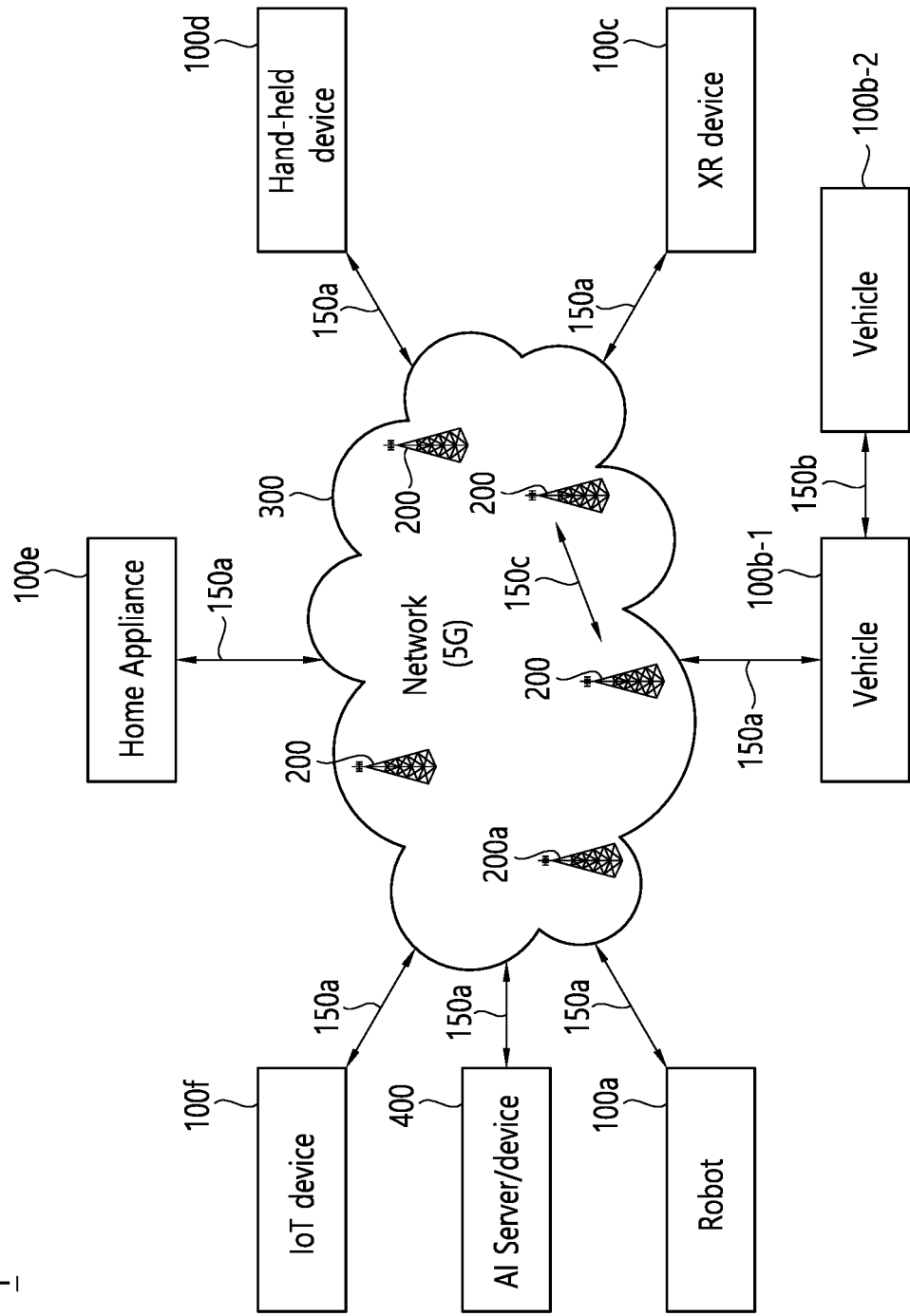
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the B Ss and the network may be implemented as wireless devices and a specific wireless device 200a may operate as a B S/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
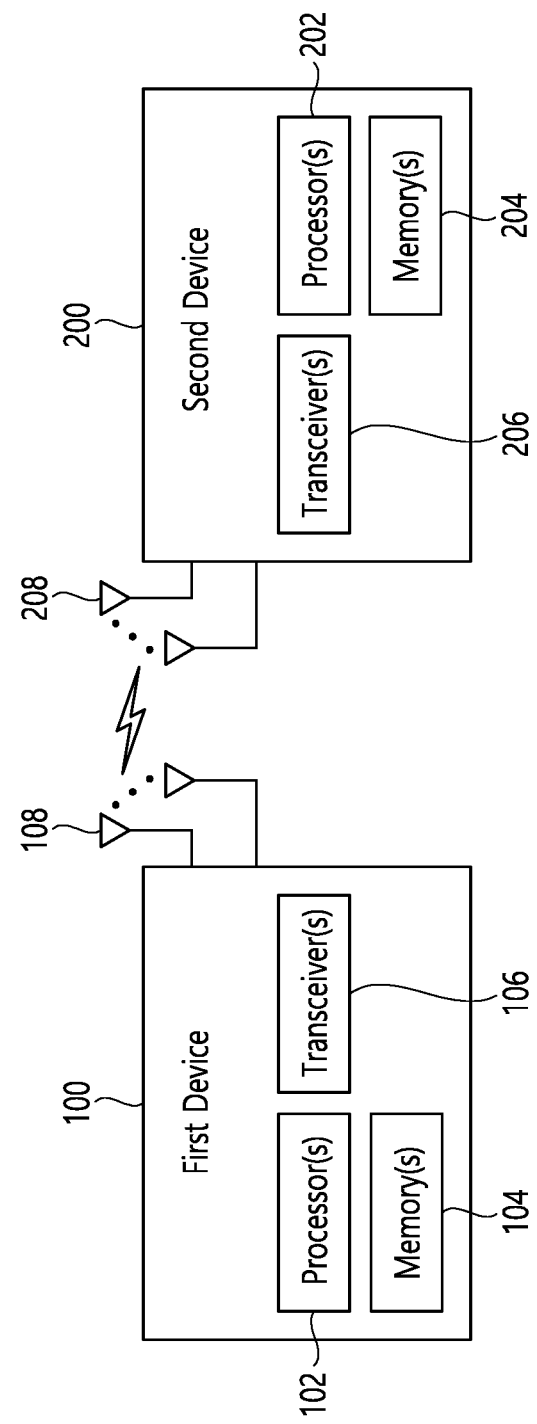
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
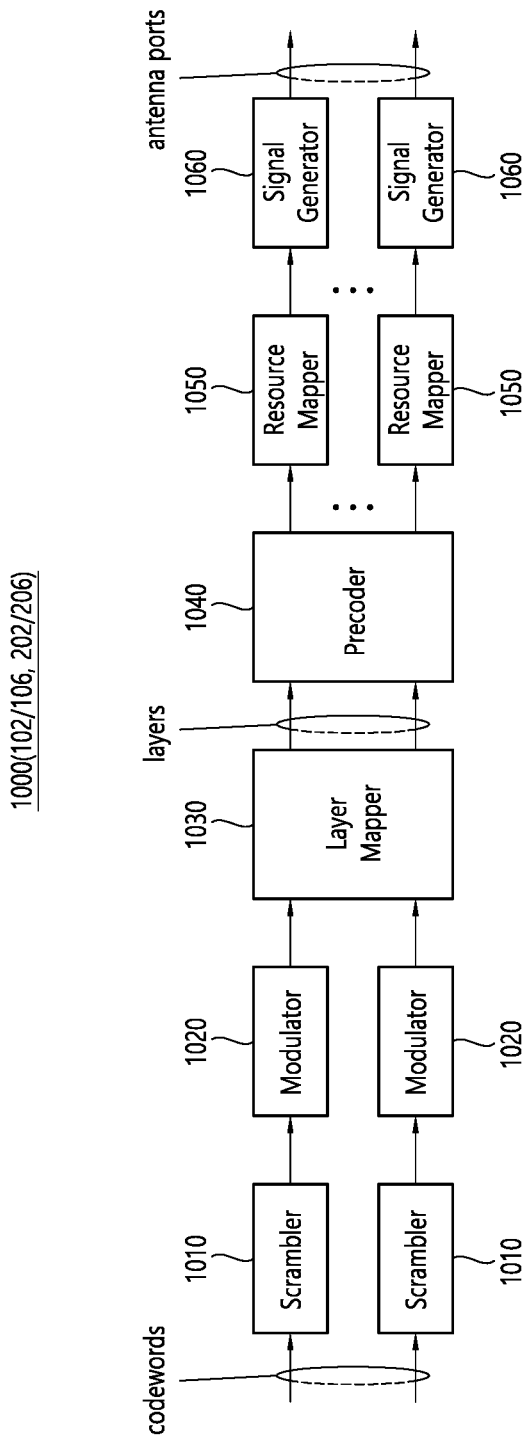
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
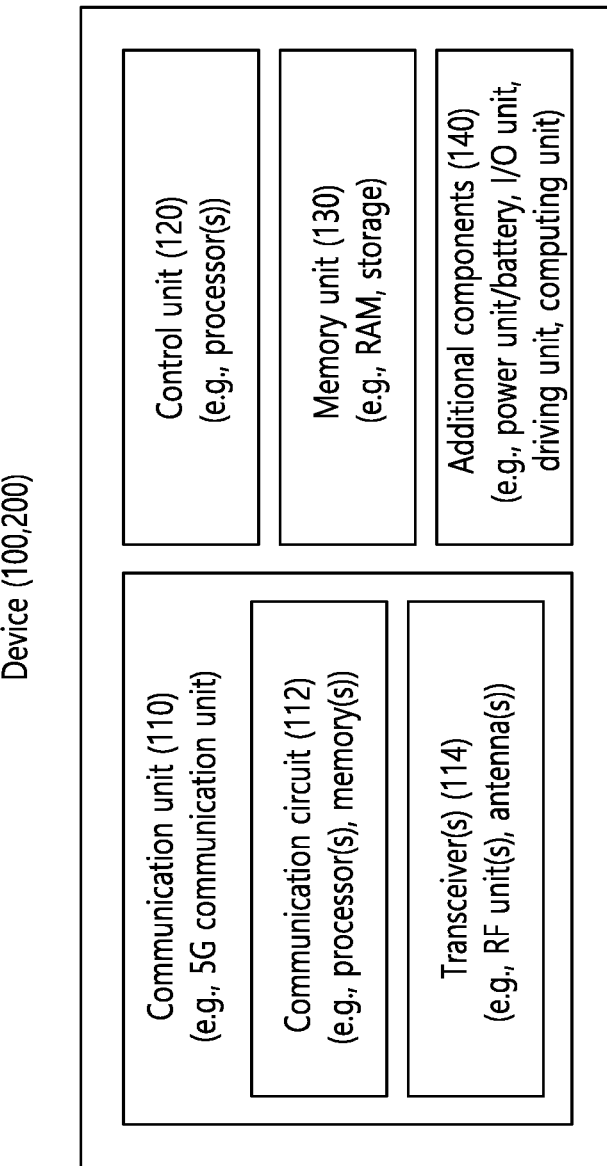
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
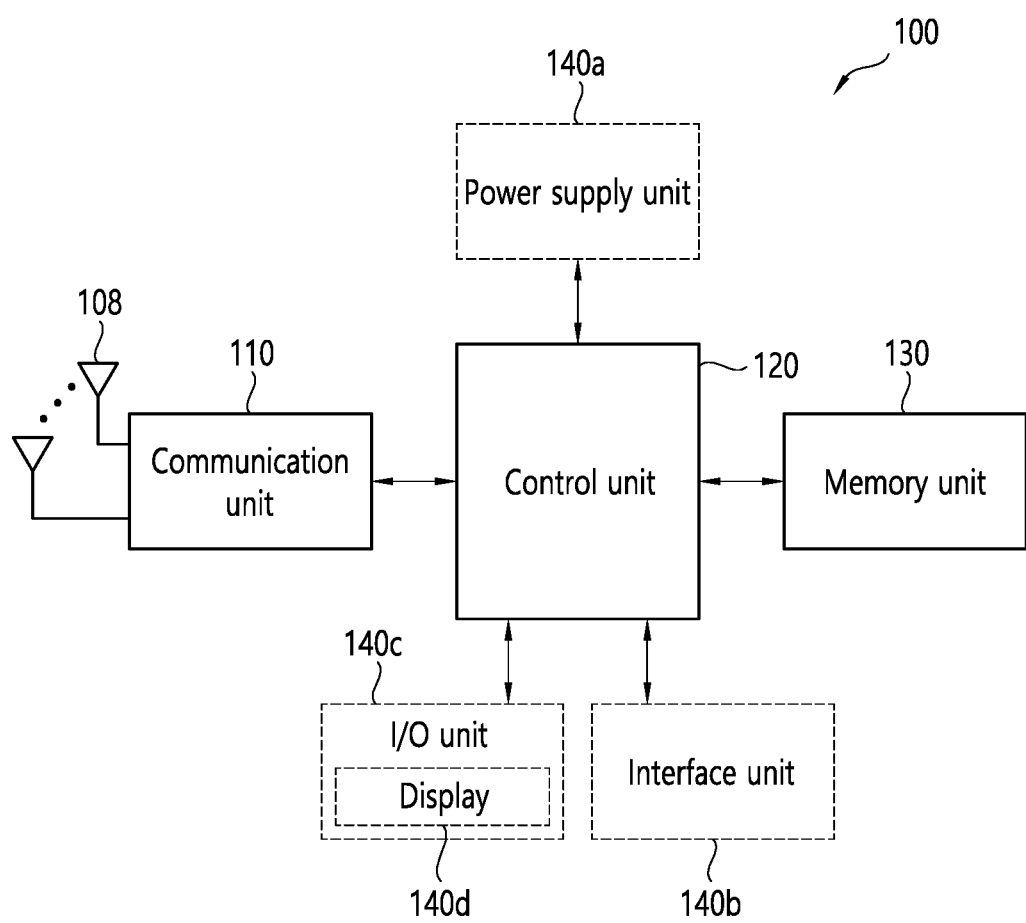
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
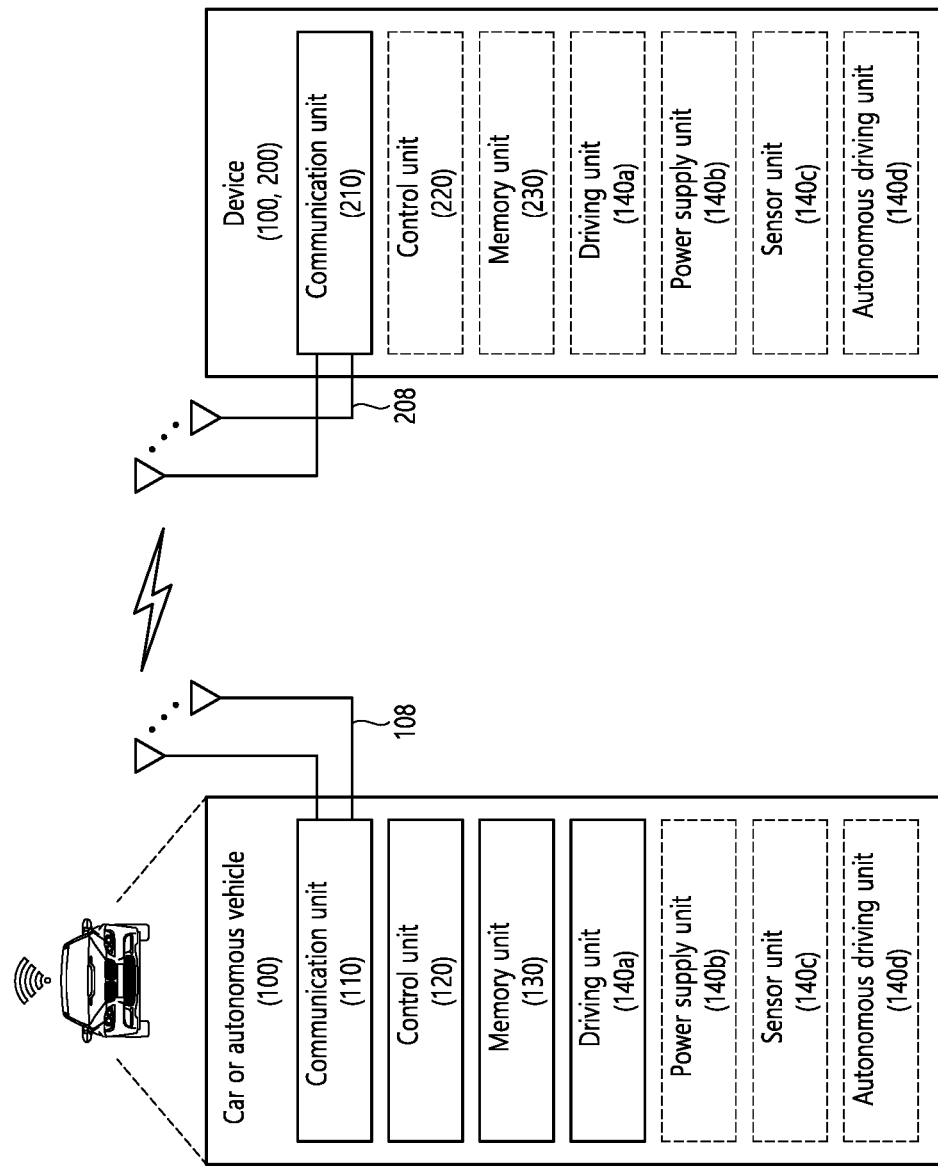
FIG. 26 shows a vehicle or an autonomous vehicle, based on an embodiment of the present disclosure.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a base station, a configured grant;
   transmitting, to a second device, a first physical sidelink control channel (PSCCH) or a first physical sidelink shared channel (PSSCH) through a first sidelink resource allocated by the configured grant;
   receiving, from the base station, a dynamic grant through a physical downlink control channel (PDCCH), wherein the dynamic grant includes index information of the configured grant related to the dynamic grant; and
   retransmitting, to the second device, the first PSCCH or the first PSSCH through a second sidelink resource allocated by the dynamic grant based on the index information of the configured grant.

2. The method of claim 1, further comprising:
   receiving, from the second device, hybrid automatic repeat request (HARQ) feedback information related to the first PSCCH or the first PSSCH; and
   reporting, to the base station, the HARQ feedback information through a physical uplink control channel (PUCCH),
   wherein the dynamic grant includes a first HARQ process ID related to the first sidelink resource.

3. The method of claim 2, wherein a sidelink control information (SCI) including a second HARQ process ID is transmitted to the second device through the first PSSCH or the first PSSCH, and
   wherein the second HARQ process ID is independent of the first HARQ process ID.

4. The method of claim 3, wherein the second HARQ process ID is reported to the base station with the HARQ feedback information.

5. The method of claim 4, wherein the first HARQ process ID is determined as the second HARQ process ID.

6. The method of claim 2, wherein a maximum number of retransmissions related to the first sidelink resource allocated by the configured grant is pre-configured.

7. The method of claim 6, wherein the maximum number of retransmissions includes a number of retransmissions of the first PSCCH or the first PSSCH to the second device through the second sidelink resource allocated by the dynamic grant.

8. The method of claim 6, wherein the maximum number of retransmissions does not include a number of transmissions of a second PSCCH or a second PSSCH through a sidelink resource allocated by the dynamic grant.

9. The method of claim 2, wherein the first HARQ process ID is determined based on a pre-configured equation.

10. The method of claim 1, wherein a downlink control information (DCI) related to the dynamic grant includes at least one of a field for a HARQ process ID, a field for an index of the configured grant, or a new data indicator (NDI) field.

11. The method of claim 10, wherein a value of the field for the HARQ process ID is a value for a pre-configured HARQ process ID among a plurality of HARQ process IDs.

12. The method of claim 1, wherein a maximum value for a number of first HARQ process IDs is configured.

13. The method of claim 1, wherein, based on the configured grant being configured simultaneously as a configured grant type 1 and a configured grant type 2, a HARQ process ID allocated to the configured grant type 1 and a HARQ process ID allocated to the configured grant type 2 are independently configured.

14. A first device configured to perform wireless communication, the first device comprising:
   one or more memories storing instructions;
   one or more transceivers; and
   one or more processors connected to the one or more memories and the one or more transceivers, wherein the one or more processors execute the instructions to:
   receive, from a base station, a configured grant;
   transmit, to a second device, a first physical sidelink control channel (PSCCH) or a first physical sidelink shared channel (PSSCH) through a first sidelink resource allocated by the configured grant;
   receive, from the base station, a dynamic grant through a physical downlink control channel (PDCCH), wherein the dynamic grant includes index information of the configured grant related to the dynamic grant; and
   retransmit, to the second device, the first PSCCH or the first PSSCH through a second sidelink resource allocated by the dynamic grant based on the index information of the configured grant.

15. The first device of claim 14, wherein the one or more processors further execute the instructions to:
   receive, from the second device, hybrid automatic repeat request (HARQ) feedback information related to the first PSCCH or the first PSSCH; and
   report, to the base station, the HARQ feedback information through a physical uplink control channel (PUCCH),
   wherein the dynamic grant includes a first HARQ process ID related to the first sidelink resource.

16. The first device of claim 15, wherein a sidelink control information (SCI) including a second HARQ process ID is transmitted to the second device through the first PSSCH or the first PSSCH, and
   wherein the second HARQ process ID is independent of the first HARQ process ID.

17. The first device of claim 16, wherein the second HARQ process ID is reported to the base station with the HARQ feedback information.

18. The first device of claim 17, wherein the first HARQ process ID is determined as the second HARQ process ID.

19. The first device of claim 14, wherein a downlink control information (DCI) related to the dynamic grant includes at least one of a field for a HARQ process ID, a field for an index of the configured grant, or a new data indicator (NDI) field.

20. An apparatus configured to control a first user equipment (UE), the apparatus comprising:
   one or more processors; and
   one or more memories operably connected to the one or more processors and storing instructions, wherein the one or more processors execute the instructions to:
   receive, from a base station, a configured grant;
   transmit, to a second UE, a first physical sidelink control channel (PSCCH) or a first physical sidelink shared channel (PSSCH) through a first sidelink resource allocated by the configured grant;
   receive, from the base station, a dynamic grant through a physical downlink control channel (PDCCH), wherein the dynamic grant includes index information of the configured grant related to the dynamic grant; and retransmit, to the second UE, the first PSCCH or the first PSSCH through a second sidelink resource allocated by the dynamic grant based on the index information of the configured grant.

* * * * *